(12) United States Patent
Ishiguro et al.

(10) Patent No.: US 11,951,729 B2
(45) Date of Patent: Apr. 9, 2024

(54) LAMINATED SHEET

(71) Applicant: Nitto Denko Corporation, Ibaraki (JP)

(72) Inventors: Shigeki Ishiguro, Ibaraki (JP); Kayo Shimokawa, Ibaraki (JP); Tetsuya Otsuka, Ibaraki (JP); Hidetoshi Maikawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 475 days.

(21) Appl. No.: 17/269,452

(22) PCT Filed: May 30, 2019

(86) PCT No.: PCT/JP2019/021517
§ 371 (c)(1),
(2) Date: Feb. 18, 2021

(87) PCT Pub. No.: WO2020/039681
PCT Pub. Date: Feb. 27, 2020

(65) Prior Publication Data
US 2021/0237396 A1 Aug. 5, 2021

(30) Foreign Application Priority Data
Aug. 23, 2018 (JP) .................. 2018-156312

(51) Int. Cl.
*B32B 5/26* (2006.01)
*B32B 5/02* (2006.01)
(Continued)

(52) U.S. Cl.
CPC ............... *B32B 5/26* (2013.01); *B32B 5/022* (2013.01); *B32B 7/12* (2013.01); *G10K 11/168* (2013.01);
(Continued)

(58) Field of Classification Search
CPC .. B32B 5/26; B32B 5/022; B32B 7/12; B32B 2262/0253; B32B 2262/105;
(Continued)

(56) References Cited

U.S. PATENT DOCUMENTS

| | | | | |
|---|---|---|---|---|
| 3,795,288 A | * | 3/1974 | Pall .................. | B01D 39/12 181/224 |
| 7,476,632 B2 | * | 1/2009 | Olson ................ | D04H 3/16 442/352 |

(Continued)

FOREIGN PATENT DOCUMENTS

| | | |
|---|---|---|
| CN | 101195938 A | 6/2008 |
| CN | 109072488 A | 12/2018 |

(Continued)

OTHER PUBLICATIONS

Office Action dated May 13, 2022, for corresponding Chinese patent application No. 201980054235.X, along with an English machine translation.

(Continued)

*Primary Examiner* — Forrest M Phillips
(74) *Attorney, Agent, or Firm* — HAUPTMAN HAM, LLP

(57) ABSTRACT

A laminated sheet includes a first porous layer including a plurality of fibers of at least one of inorganic fiber or carbonized fiber; and a second porous layer formed of a plurality of organic fibers, wherein the laminated sheet has a surface density of greater than or equal to 400 g/m² and less than or equal to 1550 g/m², wherein the second porous layer is formed of the plurality of organic fibers having a mean diameter of fibers being greater than or equal to 0.5 μm and less than or equal to 14 μm, and wherein, expressing a total volume of solids and voids filling a unit volume of the (Continued)

second porous layer as 100%, a percentage of the solids is greater than or equal to 1.0% and less than or equal to 8.0%.

9 Claims, 11 Drawing Sheets

(51) Int. Cl.
  *B32B 7/12* (2006.01)
  *G10K 11/168* (2006.01)
(52) U.S. Cl.
  CPC . *B32B 2262/0253* (2013.01); *B32B 2262/105* (2013.01); *B32B 2307/102* (2013.01); *B32B 2307/3065* (2013.01); *B32B 2307/72* (2013.01)
(58) Field of Classification Search
  CPC ...... B32B 2307/102; B32B 2307/3065; B32B 2307/72; G10K 11/168
  See application file for complete search history.

(56) References Cited

U.S. PATENT DOCUMENTS

| | | | | |
|---|---|---|---|---|
| 2006/0101626 | A1* | 5/2006 | Gallant | B29C 43/46 24/442 |
| 2010/0285101 | A1* | 11/2010 | Moore | B32B 27/02 424/443 |
| 2013/0115458 | A1* | 5/2013 | Park | C08L 97/02 525/190 |
| 2013/0327705 | A1* | 12/2013 | Clark | G10K 11/168 181/294 |
| 2014/0050886 | A1* | 2/2014 | Burgin | B32B 5/26 442/374 |
| 2014/0110963 | A1* | 4/2014 | Kuroda | B32B 27/32 296/39.3 |
| 2015/0233030 | A1 | 8/2015 | Iiba et al. | |
| 2016/0273220 | A1* | 9/2016 | Hauber | B32B 13/08 |
| 2017/0008462 | A1* | 1/2017 | Taniguchi | B60R 13/02 |
| 2017/0152616 | A1* | 6/2017 | Brown | D04H 3/02 |
| 2017/0327983 | A1 | 11/2017 | Nakahira et al. | |
| 2019/0126239 | A1 | 5/2019 | Fujieda et al. | |

FOREIGN PATENT DOCUMENTS

| | | |
|---|---|---|
| GB | 2063321 A | 6/1981 |
| JP | S63-121530 U | 8/1988 |
| JP | 2001-271438 A | 10/2001 |
| JP | 2001-316961 A | 11/2001 |
| JP | 2005-335279 A | 12/2005 |
| JP | 2006-002429 A | 1/2006 |
| JP | 2006-506551 A | 2/2006 |
| JP | 2008-76871 A | 4/2008 |
| JP | 2013-147771 A | 8/2013 |
| JP | 2014-232281 A | 12/2014 |
| JP | 2017-203231 A | 11/2017 |
| WO | 2014/030730 A1 | 2/2014 |
| WO | 2015/146428 A1 | 10/2015 |
| WO | 2019-107019 A1 | 6/2019 |

OTHER PUBLICATIONS

International Search Report issued for related PCT/JP2018/039361 dated Jan. 15, 2019, 3 pages with translation.
Notification issued in related Japanese Patent Application No. 2017-227447, dated Apr. 13, 2021, 6 pages with Machine translation.
Extended European Search Report issued in related European Patent Application No. 18883480.8, dated Jul. 8, 2021, 10 pages.
Japan Office Action issued in related Japanese Patent Application No. 2017-227447, dated Nov. 24, 2021, 6 pages with Machine translation.
Taiwan Office Action issued in related Taiwanese Patent Application No. 107142315, dated Apr. 18, 2022, 12 pages with Machine translation.
U.S. Office Action issued in related U.S. Appl. No. 16/767,036, dated May 12, 2022, 9 pages.
Office Action dated Feb. 15, 2022, for corresponding Japanese Patent Application No. 2018-156312, along with an English machine translation.
International Search Report issued for corresponding International Patent Application No. PCT/JP2019/021517 dated Aug. 20, 2019, along with an English translation.
Written Opinion issued for corresponding International Patent Application No. PCT/JP2019/021517 dated Aug. 20, 2019.
The extended European Search Report dated Apr. 22, 2022 for corresponding European Patent Application No. 19852943.0.
U.S. Office Action dated Nov. 23, 2022, in related U.S. Appl. No. 16/767,036 (13 pages).
Communication pursuant to Article 94(3) EPC dated Mar. 10, 2023 for corresponding European Patent Application No. 18 883 480.8 (8 pages).
Office Action dated Mar. 16, 2023 for co-pending U.S. Appl. No. 16/767,036 (14 pages).
Office Action dated Jul. 5, 2023 for co-pending U.S. Appl. No. 16/767,036 (14 pages).

* cited by examiner

LAMINATED SHEET

CROSS REFERENCE TO RELATED APPLICATION

This application is a National Stage of International Application No. PCT/JP2019/021517, filed on May 30, 2019, which designates the United States and was published in Japan, and which claims priority to Japanese Patent Application No. 2018-156312, filed on Aug. 23, 2018 in the Japan Patent Office. All of the aforementioned applications are hereby incorporated by reference in their entireties.

TECHNICAL FIELD

The present disclosure relates to a laminated sheet.

BACKGROUND ART

A sound absorbing body described in Patent Document 1 is constituted with a porous material layer formed of an inorganic porous material or an organic porous material, and a sound absorbing layer constituted with a heat resistant felt material laminated on a sound source side of the porous material layer. The sound absorbing layer is formed of one of a felt material of ceramic fibers, glass cloth, non-woven fabric of glass fibers, rock wool, and glass wool; or a mixture of these.

RELATED ART DOCUMENTS

Patent Document

Patent Document 1: Japanese Laid-Open Patent Application No. 2008-76871

SUMMARY OF THE INVENTION

Problem to be Solved by the Invention

The sound absorbing body in the first example described in Patent Document 1 includes a porous material layer formed of a PET felt material having a thickness of 40 mm and a surface density of 1.4 kg/m², and a sound absorbing layer formed of a silica mat having a surface density of 0.4 kg/m² laminated on the sound source side of the porous material layer. The surface density of the sound absorbing body was 1.8 kg/m², and the weight of the sound absorbing body was heavy. Also, experimental data of the flame retardancy of this sound absorbing body was not described in Patent Document 1.

According to one aspect in the present disclosure, a laminated sheet that is excellent in terms of the flame retardancy, the soundproof performance, and the lightness is provided.

Means for Solving the Problem

According to one aspect in the present disclosure, a laminated sheet includes a first porous layer including a plurality of fibers of at least one of inorganic fiber or carbonized fiber; and a second porous layer formed of a plurality of organic fibers,
  wherein the laminated sheet has a surface density of greater than or equal to 400 g/m² and less than or equal to 1550 g/m²,
  wherein the second porous layer is formed of the plurality of organic fibers having a mean diameter of fibers being greater than or equal to 0.5 μm and less than or equal to 14 μm, and
  wherein, expressing a total volume of solids and voids filling a unit volume of the second porous layer as 100%, a percentage of the solids is greater than or equal to 1.0% and less than or equal to 8.0%.

Advantageous Effect of the Present Invention

According to one aspect in the present disclosure, a laminated sheet that is excellent in terms of the flame retardancy, the soundproof performance, and the lightness can be provided.

EMBODIMENTS FOR CARRYING OUT THE INVENTION

In the following, embodiments in the present disclosure will be described with reference to the drawings. Note that identical or corresponding elements throughout the drawings are assigned identical or corresponding reference symbols, and the description may be omitted.

Figure 1:
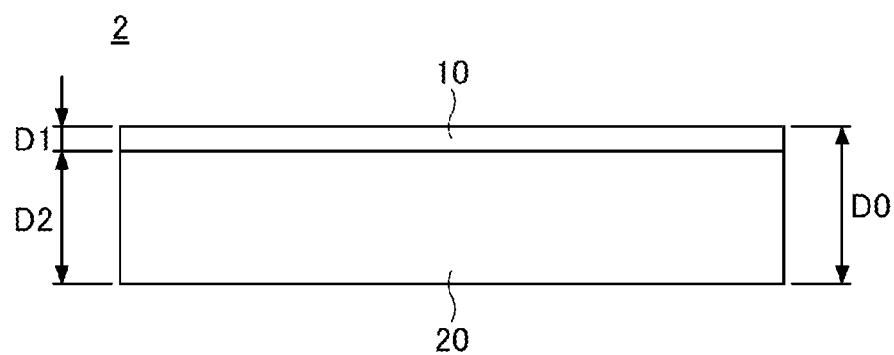
FIG. 1 is a cross sectional view illustrating a laminated sheet according an embodiment.

FIG. 1 is a cross sectional view illustrating a laminated sheet according an embodiment. As illustrated in FIG. 1, a laminated sheet 2 includes a first porous layer 10 and a second porous layer 20. The first porous layer 10 is provided to improve the flame retardancy of the laminated sheet 2, and includes multiple fibers of at least one of inorganic fiber or carbonized fiber. On the other hand, the second porous layer 20 is provided to improve the soundproof performance of the laminated sheet 2, and formed of multiple organic fibers.

The first porous layer 10 is provided to improve the flame retardancy of the laminated sheet 2; therefore, it is arranged on the fire source side with respect to the second porous layer 20. The temperature of the second porous layer 20 can be curbed to be lower than or equal to a temperature at which the organic fibers forming the second porous layer 20 pyrolytically decompose. The form of the first porous layer 10 may be any one of woven fabric, non-woven fabric, felt, and the like.

On the other hand, the second porous layer 20 is provided to improve the soundproof performance of the laminated sheet 2; therefore, it is basically arranged on the sound source side with respect to the first porous layer 10. However, it may be arranged on the opposite side of the sound source with respect to the first porous layer 10. This is because sound waves can transmit through the first porous layer 10. The form of the second porous layer 20 may be any one of woven fabric, non-woven fabric, felt, and the like.

The first porous layer 10 and the second porous layer 20 may be separately molded, and then, bonded together. When bonding these together, for example, an adhesive is used. As the adhesive, a hot melt such as a thermoplastic resin, a double-sided tape, or the like is used. The double-sided tape is provided to improve the flame retardancy, and may or may not include a substrate. The adhesive may be formed, for example, to have a net-shape so that sound waves can easily transmit through the adhesive. Needle punching may be used instead of the adhesive. The needle punching method is a method in which the first porous layer 10 and the second porous layer 20 are overlaid, and fibers are interknitted near the interface of the first porous layer 10 and the second porous layer 20.

Figure 2:
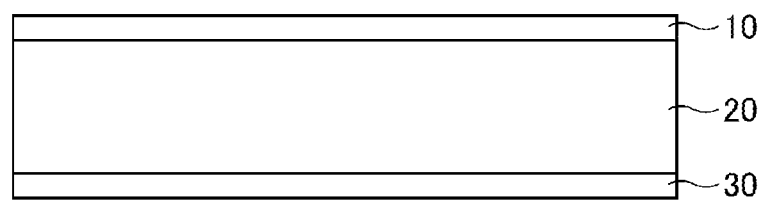
FIG. 2 is a cross sectional view illustrating a laminated sheet according to a modified example.

In the following, an overall configuration of the laminated sheet 2, a configuration of the first porous layer 10, and a configuration of the second porous layer 20 will be described in this order. Note that as illustrated in FIG. 2, the laminated sheet 2 may include a third porous layer 30 that is arranged on a side of the second porous layer 20 that is opposite to the side on which the first porous layer 10 is arranged. The third porous layer 30 includes multiple fibers of at least one of inorganic fiber or carbonized fiber. The configuration of the third porous layer 30 is substantially the same as that of the first porous layer 10; therefore, the description is omitted.

For example, the laminated sheet 2 is used as a soundproofing material to attenuate incident sound waves. The laminated sheet 2 converts the energy of the incident sound waves to thermal energy, to attenuate the incident sound waves by converting the energy of the incident sound waves to thermal energy. When a sound wave is incident on the laminated sheet 2, the air vibrates in the porous laminated sheet 2, and thereby, friction is generated between the air and the fibers forming the laminated sheet 2, and the energy of the sound waves is converted to thermal energy.

The laminated sheet 2 may be used as a sound absorbing material, or may be used as a sound insulating material. A sound absorbing material is used for suppressing reflection of sound waves incident from a sound source. A sound insulating material is used for suppressing transmission of sound waves incident from a sound source. The laminated sheet 2 may also serve as both the sound absorbing material and the sound insulating material.

The laminated sheet 2 is used for noise reduction in modes of transportation, buildings, household electrical appliances, large electrical appliances, and the like. As the modes of transportation, for example, vehicles such as automobiles and trains, airplanes, and the like may be enumerated. Noise of vehicles includes noise of moving vehicles, reflected sound of noise of moving vehicles reflected by tunnels and sound insulating walls, and operating noise of installed devices installed in vehicles (e.g., air conditioners and engines). As the buildings, for example, factories, movie theaters, karaoke boxes, music halls, and the like may be enumerated. As the household electrical appliances, for example, refrigerators, vacuum cleaners, outdoor units of air conditioners, household storage batteries, hot water bidet toilet seats, and the like may be enumerated. As the large electrical appliances, for example, refrigerators for business use and the like may be enumerated.

The laminated sheet 2 has a surface density of, for example, greater than or equal to 400 $g/m^2$ and less than or equal to 1550 $g/m^2$. If the surface density of the laminated sheet 2 is less than or equal to 1550 $g/m^2$, the lightness of the laminated sheet 2 is good. On the other hand, if the surface density of the laminated sheet 2 is greater than or equal to 400 $g/m^2$, a thickness D0 of the laminated sheet 2 is not too thin; therefore, sound waves tend to be easily absorbed in the laminated sheet 2. Therefore, the transmission of sound waves can be suppressed, and thus, good sound insulating performance can be obtained. The surface density of the laminated sheet 2 is favorably greater than or equal to 500 $g/m^2$ and less than or equal to 1450 $g/m^2$.

The laminated sheet 2 has a thickness D0 of, for example, greater than or equal to 1 mm and less than or equal to 100 mm. If the thickness D0 of the laminated sheet 2 is less than or equal to 100 mm, the lightness of the laminated sheet 2 is good. Also, if the thickness D0 of the laminated sheet 2 is less than or equal to 100 mm, the thickness D0 of the laminated sheet 2 is not too thick; therefore, it is easier for sound waves to be incident on the laminated sheet 2. Therefore, the reflection of sound waves can be suppressed, and thus, good sound absorbing performance can be obtained. On the other hand, if the thickness D0 of the laminated sheet 2 is greater than or equal to 1 mm, the thickness D0 of the laminated sheet 2 is not too thin; therefore, sound waves tend to be easily absorbed in the laminated sheet 2. Therefore, the transmission of sound waves can be suppressed, and thus, good sound insulating performance can be obtained. The thickness D0 of the laminated sheet 2 is favorably greater than or equal to 5 mm and less than or equal to 80 mm.

The laminated sheet 2 has an attenuation constant of, for example, greater than or equal to 10 Neper/m and less than or equal to 30 Neper/m. If the attenuation constant of the laminated sheet 2 is greater than or equal to 10 Neper/m, sound waves incident on the laminated sheet 2 tend to be easily absorbed in the laminated sheet 2. Therefore, the transmission of sound waves can be suppressed, and thus, good sound insulating performance can be obtained. On the other hand, if the attenuation constant of the laminated sheet 2 is less than or equal to 30 Neper, the bulk density of the laminated sheet 2 is not too high; therefore, it is easier for sound waves to be incident on the laminated sheet 2. Therefore, the reflection of sound waves can be suppressed, and thus, good sound absorbing performance can be obtained. The attenuation constant of the laminated sheet 2 is favorably greater than or equal to 12 Neper/m and less than or equal to 25 Neper/m.

The laminated sheet 2 has a characteristic impedance of, for example, greater than or equal to 300 $N·s/m^3$ and less than or equal to 1400 $N·s/m^3$. The characteristic impedance represents difficulty in transmission of sound waves. A higher characteristic impedance tends to hinder transmission of sound waves more notably, and to cause sound waves to be more easily reflected, and hence, the sound absorbing performance is reduced. If the characteristic impedance of the laminated sheet 2 is greater than or equal to 300 $N·s/m^3$, sound waves incident on the laminated sheet 2 tend to be easily absorbed in the laminated sheet 2. Therefore, the transmission of sound waves can be suppressed, and thus, good sound insulating performance can be obtained. On the other hand, if the characteristic impedance of the laminated sheet 2 is less than or equal to 1400 N·s/m³, it is easier for sound waves to be incident on the laminated sheet 2. Therefore, the reflection of sound waves can be suppressed, and thus, good sound absorbing performance can be obtained.

The first porous layer 10 is provided to improve the flame retardancy of the laminated sheet 2, and includes multiple fibers of at least one of inorganic fiber or carbonized fiber. As the inorganic fiber, glass fiber, ceramic fiber, metal fiber, and carbon fiber may be enumerated. The cemirac fiber is, for example, silica fiber. The metal fiber is, for example, aluminum fiber or copper fiber. The carbon fiber is obtained by entirely carbonizing polyacrylonitrile fiber. On the other hand, the carbonized fiber is obtained by partially carbonizing polyacrylonitrile fiber. For example, by heating polyacrylonitrile fiber at a temperature higher than or equal to 200° C. and lower than or equal to 300° C. under an air atmosphere, the carbonized fiber is obtained; and by heating the carbonized fiber at a temperature higher than or equal to 1200° C. and lower than or equal to 1400° C. under an inert gas atmosphere, the carbon fiber is obtained. The first porous layer 10 may include multiple types of inorganic fibers. Also, the first porous layer 10 may include both inorganic fiber and carbide fiber.

The first porous layer 10 has a thickness D1 of, for example, greater than or equal to 0.5 mm and less than or equal to 10 mm. If the thickness D1 of the first porous layer 10 is greater than or equal to 0.5 mm, heat of a fire source can be suppressed from transferring to the second porous layer 20 through the first porous layer 10. Therefore, the temperature of the second porous layer 20 can be suppressed to be lower than or equal to a temperature at which the organic fibers forming the second porous layer 20 pyrolytically decompose. On the other hand, if the thickness D1 of the first porous layer 10 is less than or equal to 10 mm, the surface density of the laminated sheet 2 is not too large; therefore, the lightness is good, and also, the soundproof performance is good. The thickness D1 of the first porous layer 10 is favorably greater than or equal to 0.7 mm and less than or equal to 7 mm, and more favorably greater than or equal to 0.9 mm and less than or equal to 5 mm.

The first porous layer 10 has a coefficient of overall heat transmission of, for example, greater than or equal to 5.0 W/m²·K and less than or equal to $1.0 \times 10^3$ W/m²·K. The coefficient of overall heat transmission T1 of the first porous layer 10 can be expressed by a formula "T1=λ1/D1", where λ1 represents the thermal conductivity of the first porous layer 10, and D1 represents the thickness of the first porous layer 10. If the coefficient of overall heat transmission of the first porous layer 10 is less than or equal to $1.0 \times 10^3$ W/m²·K, heat of a fire source can be suppressed from transferring to the second porous layer 20 through the first porous layer 10. Therefore, when conducting a combustion test illustrated in FIG. 12, the deformation ratio can be limited to be less than or equal to 50%. The deformation ratio is, when expressing the total area of a principal surface of the second porous layer 20 on the opposite side with respect to a fire source as 100%, the percentage of the area of a portion deformed by heat of the principal surface. On the other hand, if the coefficient of overall heat transmission of the first porous layer 10 is greater than or equal to 5.0 W/m²·K, the thickness D1 of the first porous layer 10 is not too thick; therefore, the lightness of the laminated sheet 2 is good. The coefficient of overall heat transmission of the first porous layer 10 is favorably greater than or equal to 6.7 W/m²·K and less than or equal to $7.7 \times 10^2$ W/m²·K, and more favorably greater than or equal to $1.0 \times 10^1$ W/m²·K and less than or equal to $5.9 \times 10^2$ W/m²·K.

Figure 3:
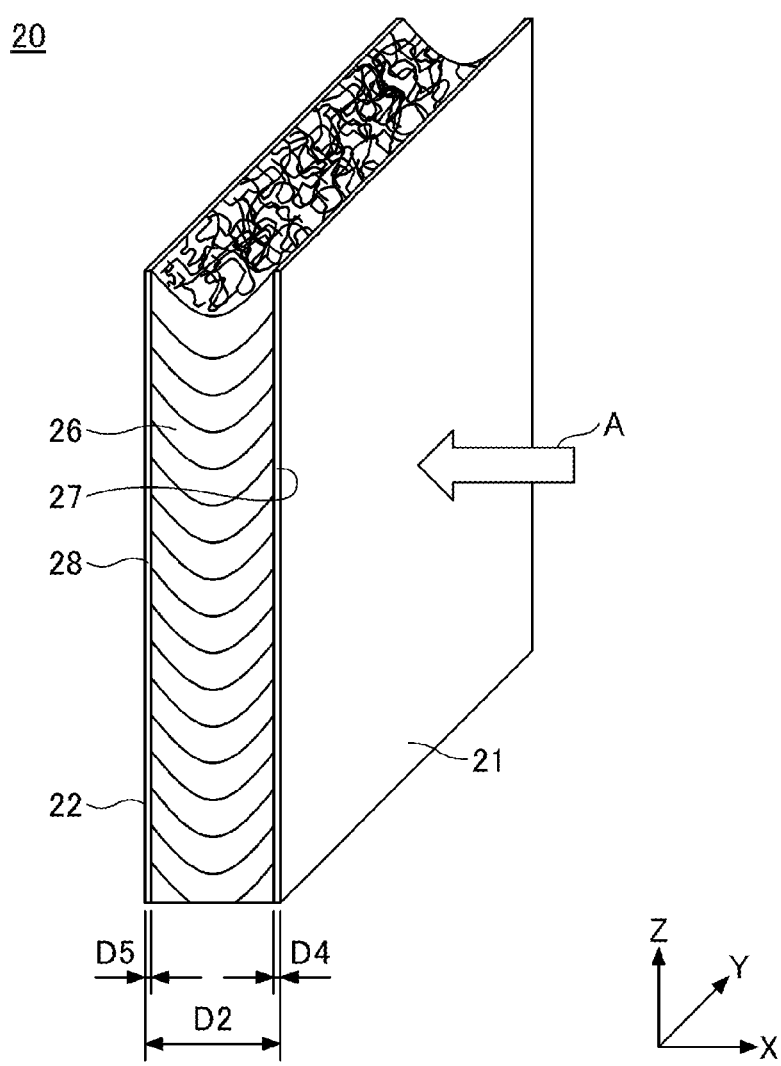
FIG. 3 is a perspective view illustrating a second porous layer according an embodiment.
Figure 4:
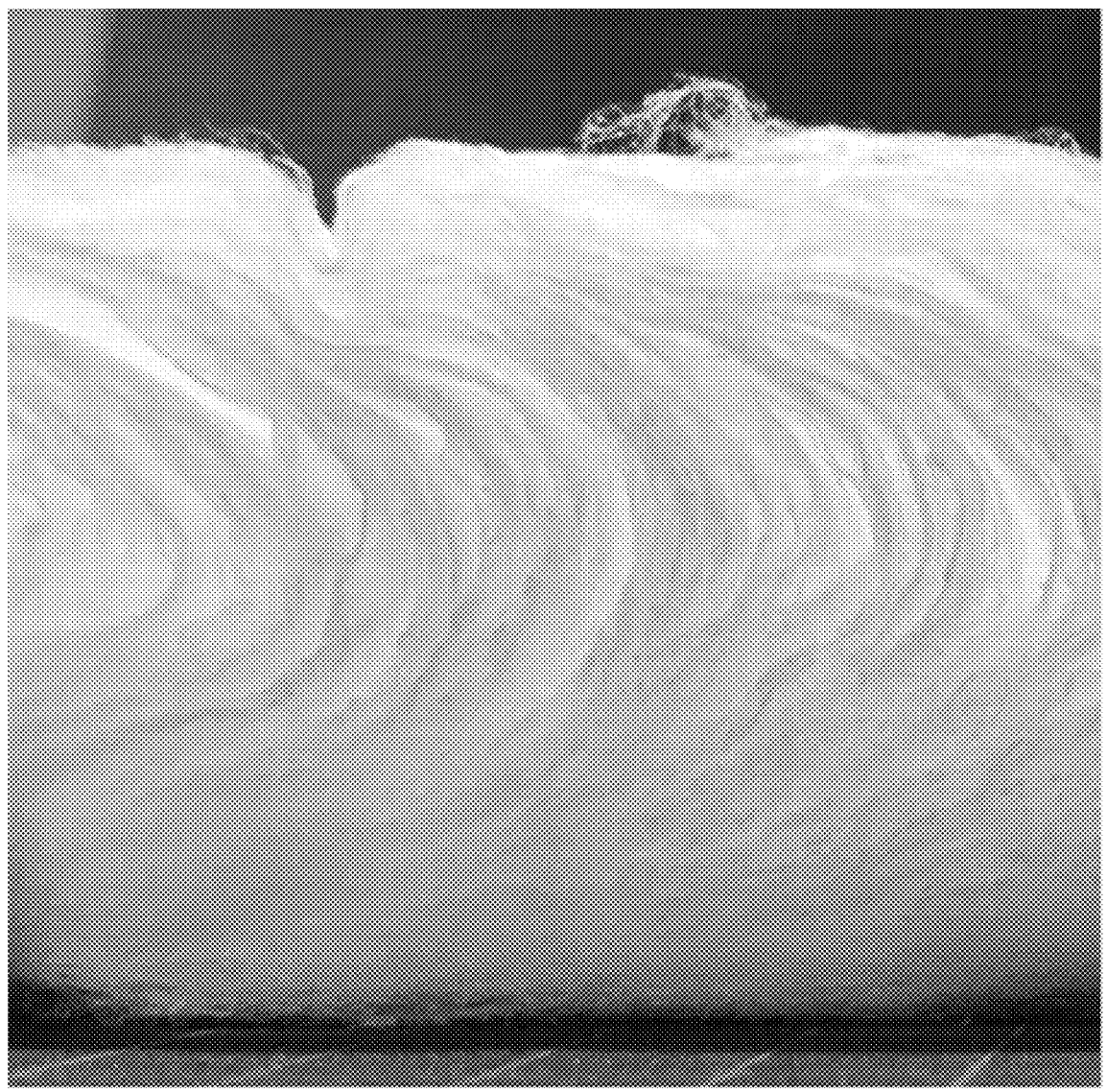
FIG. 4 is a cross sectional photograph presenting a second porous layer according an embodiment.
Figure 4:
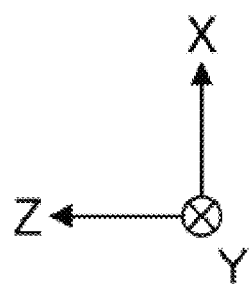

FIG. 3 is a perspective view illustrating a second porous layer according an embodiment. FIG. 4 is a cross sectional photograph presenting a second porous layer according an embodiment. In FIGS. 3 and 4, the X-axis direction, the Y-axis direction, and the Z-axis direction are perpendicular to one another. The X-axis direction corresponds to the thickness direction of the second porous layer. The Y-axis direction and the Z-axis direction correspond to in-plane directions of the second porous layer. The Z-axis direction corresponds to a direction in which multiple non-woven fabric layers are arranged.

In FIG. 3, an arrow A indicates an incident direction of a sound wave on the second porous layer 20. Note that in FIG. 3, although the sound wave is incident on the principal surface 21 of the second porous layer 20 perpendicularly, it may be incident obliquely. Also, sound waves may incident on from both sides of the second porous layer 20, and may incident on both of the two principal surfaces 21 and 22.

The second porous layer 20 is provided to attenuate incident sound waves. The second porous layer 20 converts the energy of the incident sound waves to thermal energy, to attenuate the incident sound waves by converting the energy of the incident sound waves to thermal energy. When a sound wave is incident on the second porous layer 20, the air vibrates in the second porous layer 20, and thereby, friction is generated between the air and the organic fibers forming the second porous layer 20, and the energy of the sound waves is converted to thermal energy.

The second porous layer 20 may be used as a sound absorbing material, or may be used as a sound insulating material. A sound absorbing material is used for suppressing the reflection of sound waves incident from a sound source. A sound insulating material is used for suppressing the transmission of sound waves incident from a sound source. The second porous layer 20 may also serve as both the sound absorbing material and the sound insulating material.

The second porous layer 20 is formed of multiple organic fibers. The organic fiber is not limited in particular; and polyester fiber, polyolefin-based resin fiber, polyamide fiber, acrylic fiber, nylon fiber, and the like can be used. Among these, from the viewpoint of weight reduction, polyolefin resin fiber is particularly favorable. The second porous layer 20 may be formed of one type of organic fiber, or may be formed of multiple types of organic fibers.

Note that the second porous layer 20 may include an additive in addition to the organic fiber. The additive is, for example, a flame-retardant agent. The flame-retardant agent may be an organic flame-retardant agent, or may be an inorganic flame-retardant agent. As the organic flame-retardant agent, for example, a phosphorous-based compound, halogen-based compound, nitrogen-based compound, silicone-based compound, boron-based compound, or the like may be enumerated. As the inorganic flame-retardant agent, metal hydrate, antimony trioxide, inorganic phosphorus, or the like may be enumerated. The additive may also be a water-repellent agent. As the water-repellent agent, a fluorine-based compound and the like may be enumerated. The other additives include a weathering stabilizer, an antioxidant, a colorant, and the like. The additives may be coated on the organic fibers.

The second porous layer 20 is formed of organic fibers having a mean diameter of fibers being, for example, greater than or equal to 0.5 µm and less than or equal to 14 µm. If the mean diameter of fibers of the second porous layer 20 is greater than or equal to 0.5 µm, the second porous layer 20 can be produced easily, and also, a sufficient strength of the second porous layer 20 can be obtained. On the other hand, if the mean diameter of fibers of the second porous layer 20 is less than or equal to 14 µm, the surface area of organic fibers per unit volume is large; therefore, friction tends to be easily generated between the air and the organic fibers, and sound waves can be attenuated efficiently. The mean diameter of fibers of the second porous layer 20 is favorably greater than or equal to 1 µm and less than or equal to 14 µm, and more favorably greater than or equal to 1.5 µm and less than or equal to 10 µm.

The second porous layer 20 is constituted with solids such as organic fibers having a mean diameter of fibers of 0.5 µm to less than or equal to 14 µm, and voids formed between the organic fibers. In order to improve the soundproof performance of the second porous layer 20, the inventors of the present invention paid attention to the solid occupancy S, to which attention had not been paid conventionally.

The solid occupancy S is, when expressing the total volume of solids and voids filling the unit volume of the second porous layer 20 as 100%, the percentage of the solids. In other words, the solid occupancy S is a value obtained by multiplying the bulk density (BD) of the second porous layer 20 divided by the true density (TD) of the solids by 100 (BD/TD×100). The solid occupancy S is equivalent to 100 minus the porosity.

A larger solid occupancy S makes the contact area larger between the air and the organic fibers whose mean diameter is greater than or equal to 0.5 µm and less than or equal to 14 µm, which improves the efficiency of converting the energy of sound waves to thermal energy by friction between the organic fibers and the air, and thereby, improves the soundproof performance. On the other hand, a smaller solid occupancy S makes the density smaller, and the weight can be lighter.

In the present embodiment, the solid occupancy S is greater than or equal to 1.0% and 8.0%. If the solid occupancy of S is greater than or equal to 1.0%, sound waves tends to be more easily attenuated by friction between the air and the organic fibers whose mean diameter is greater than or equal to 0.5 µm and less than or equal to 14 µm, and an attenuation constant of greater than or equal to 10 Neper/m can be achieved. Also, if the solid occupancy S is less than or equal to 8.0%, the weight can be lighter. The solid occupancy S is favorably greater than or equal to 1.3% and less than or equal to 7.0%, and more favorably greater than or equal to 1.4% and less than or equal to 6.0%.

The solids mainly include organic fibers whose mean fiber diameter is greater than or equal to 0.5 µm and less than or equal to 14 µm. The solids may include organic fibers whose fiber diameter is greater than or equal to 10 µm and less than or equal to 30 µm, as long as the mean diameter of fibers is greater than or equal to 0.5 µm and less than or equal to 14 µm. Also, the solid may include low melting point organic fibers and/or adhesive organic fibers to maintain the shape of the second porous layer 20. Further, the solid may include the above additives to an extent that does not impair the soundproof performance.

The second porous layer 20 has a thickness D2 of, for example, greater than or equal to 1 mm and less than or equal to 100 mm. If the thickness D2 of the second porous layer 20 is greater than or equal to 1 mm, the shape of the second porous layer 20 can be maintained. On the other hand, if the thickness D2 of the second porous layer 20 is less than or equal to 100 mm, the weight of the second porous layer 20 can be reduced.

The second porous layer 20 includes multiple non-woven fabric layers 26 that are peelable and arranged continuously in a predetermined in-plane direction (the Z-axis direction in FIGS. 3 and 4) between the two principal surfaces 21 and 22 facing each other. Each of the multiple non-woven fabric layers 26 is constituted with multiple organic fibers interknitted together as viewed in the predetermined in-plane direction (the Z-axis direction in FIGS. 3 and 4). Adjacent non-woven fabric layers 26 can be peeled easily at the interface of these.

In order to increase the peel strength of adjacent non-woven fabric layers 26, although crimped fibers connecting the non-woven fabric layers 26 to each other may be inserted, such crimped fibers are not inserted in the present embodiment. This is because crimped fibers have a large fiber diameter and a small specific surface area, and therefore, it is difficult to obtain energy attenuation by the viscous resistance of the air, and the attenuation constant becomes smaller.

By the way, a sound wave is a longitudinal wave (a wave of condensation and rarefaction) by which vibration of the air density transmits. When the air density changes in the voids formed between an organic fiber and another organic fiber, a pressure change caused by the changes in the air density occur in the organic fibers. In the case where the same pressure change occurs simultaneously at any parts of one organic fiber, the organic fiber resonates. The organic fiber resonates, for example, in the case where the organic fiber is arranged perpendicular to the direction of transmission of the sound wave.

A greater number of resonant organic fibers tends to hinder transmission of sound waves more notably and tends to cause sound waves to be more easily reflected, and hence, the sound absorbing performance is reduced. The difficulty in transmission of sound waves can be evaluated with the characteristic impedance. A higher characteristic impedance tends to hinder transmission of sound waves more notably and tends to cause sound waves to be more easily reflected, and hence, the sound absorbing performance is reduced.

Also, a greater number of resonant organic fibers tends to hinder transmission of sound waves more notably, and to hinder attenuation of the sound wave by friction between the air and the organic fibers.

According to the present embodiment, as described above, the multiple non-woven fabric layers 26 are peelable and arranged continuously in the Z-axis direction. Therefore, for example, when a sound wave is incident in the X-axis direction as indicated by the arrow A in FIG. 3, the number of organic fibers perpendicular to the transmission direction of the sound wave can be reduced in each of the non-woven fabric layers 26, and the resonance of the organic fibers can be suppressed in each of the non-woven fabric layers 26. As a result, the characteristic impedance can be reduced compared to a horizontally oriented article having the same bulk density, namely, a horizontally oriented article having the same solid occupancy S. As will be described in detail later, a structure in which multiple non-woven fabric layers 26 are arranged continuously in an in-plane direction (in the Z-axis direction in FIGS. 3 and 4) will be referred to as vertical orientation; and a structure in which multiple non-woven fabric layers 26A are arranged continuously in a thickness direction (in the Z-axis direction in FIGS. 9 and 10) will also be referred to as horizontal orientation.

Note that if only the characteristic impedance (i.e., the difficulty in transmission of sound waves) needs to be reduced, one may consider to make the solid occupancy S be less than 1.0% (i.e., to make the porosity be greater than or equal to 99.0%). In this case, the attenuation constant becomes too small, and hence, the sound insulating performance becomes worse; therefore, in the present embodiment the solid occupancy S is set to be greater than or equal to 1.0%. By setting the solid occupancy S to be greater than or equal to 1.0% and adopting a structure of vertical orientation, the sound insulating performance can be compatible with the sound absorbing performance. This is particularly effective in applications in which both functions of a sound insulating material and a sound absorbing material are required.

Figure 5:
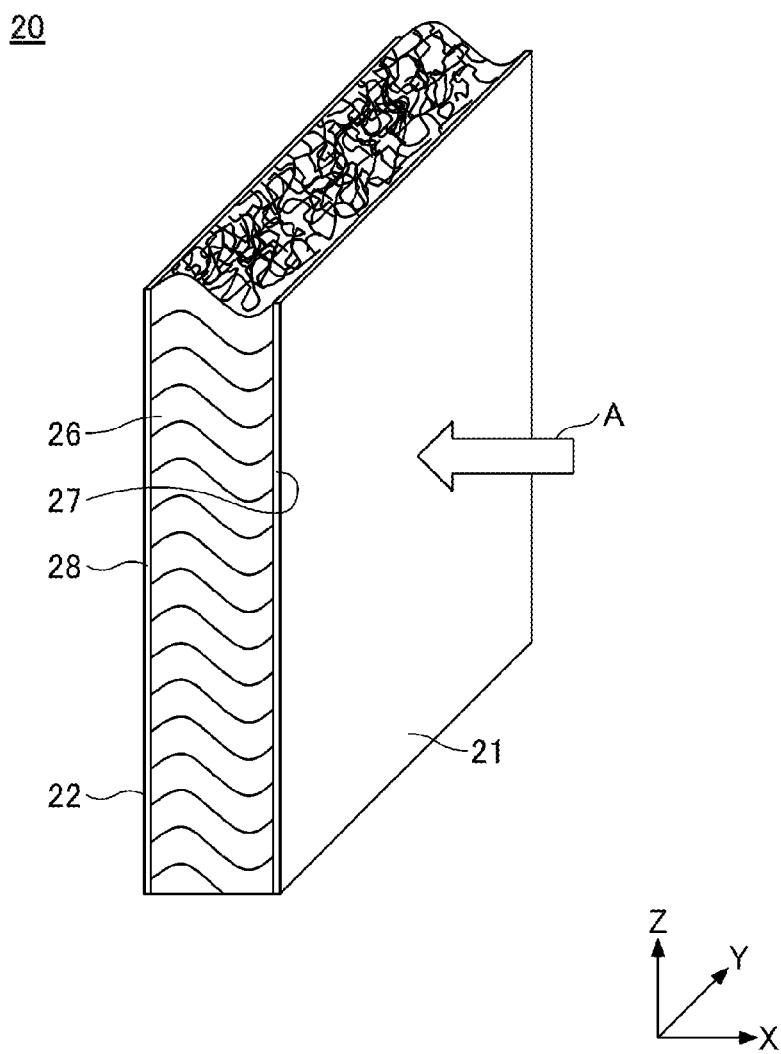
FIG. 5 is a perspective view illustrating a second porous layer according to a first modified example.
Figure 6:
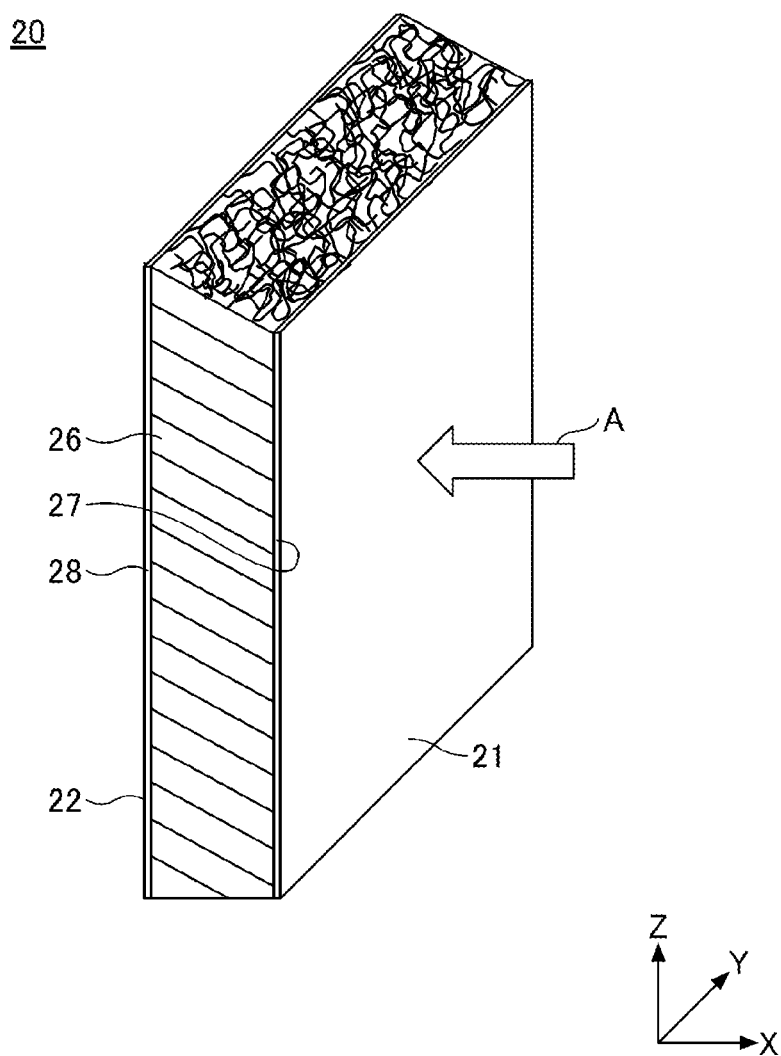
FIG. 6 is a perspective view illustrating a second porous layer according to a second modified example.

The non-woven fabric layer 26 is formed in a C-shape as viewed in the Y-axis direction, as illustrated in FIGS. 3 and 4. Note that although the shape of the non-woven fabric layer 26 as viewed in the Y-axis direction is a C-shape in the present embodiment, it is not limited in particular as such; the shape may be, for example, a wave shape as illustrated in FIG. 5, or a linear shape as illustrated in FIG. 6. Although the shape of the non-woven fabric layer 26 as viewed in the Y-axis direction is a line oblique with respect to the Z-axis direction in FIG. 6, the shape may be a line perpendicular to the Z-axis direction.

The second porous layer 20 has a skin layer 27 on the principal surface 21 as one of the two facing principal surfaces 21 and 22, and a skin layer 28 on the other principal surface 22. Each of the two skin layers 27 and 28 is a layer in which multiple organic fibers are interknitted (i.e., non-woven fabric) as viewed in the thickness direction (in the X-axis direction in FIGS. 3 and 4).

Multiple non-woven fabric layers 26 are provided between the two skin layers 27 and 28, and each of the non-woven fabric layers 26 is formed continuously with the two skin layers 27 and 28. The thickness of each of the skin layers 27 and 28 is thin, and when adjacent non-woven fabric layers 26 are peeled at the interface of the two, the skin layers 27 and 28 are separated by an extended surface of the interface.

The thickness D4 of the skin layer 27 and the thickness D5 of the skin layer 28 are greater than or equal to 0.01 mm and less than or equal to 5 mm, respectively. If the thickness D4 and the thickness D5 are each greater than or equal to 0.01 mm, unintentional peeling at the interface of adjacent non-woven fabric layer 26 can be suppressed, and the shape can be maintained. On the other hand, if the thickness D4 and the thickness D5 are each less than or equal to 5 mm, sound reflection by the skin layer 27 can be suppressed, and attenuation of sound waves in the non-woven fabric layers 26 can be expedited. The thickness D4 and the thickness D5 are each favorably greater than or equal to 0.3 mm and less than or equal to 4 mm, and more favorably greater than or equal to 0.6 mm and less than or equal to 3 mm.

As the production method of the second porous layer 20, although not limited in particular, a melt spinning method is favorable, and in particular, a melt-blown method is favorable. The melt-blown method is a method in which molten thermoplastic resin is blown out of a nozzle and stretched to be fibrous with a high-temperature and high-speed airflow, to spin organic fibers on a collector. The thermoplastic resin includes at least one type among polyolefinic resin, polyester resin, and polyamide resin.

Note that the production method of the second porous layer 20 is not limited to the melt-blown method, and may be, for example, an electrospinning method. Non-woven fabrics can be obtained by the melt-blown method or the electrospinning method.

Figure 7:
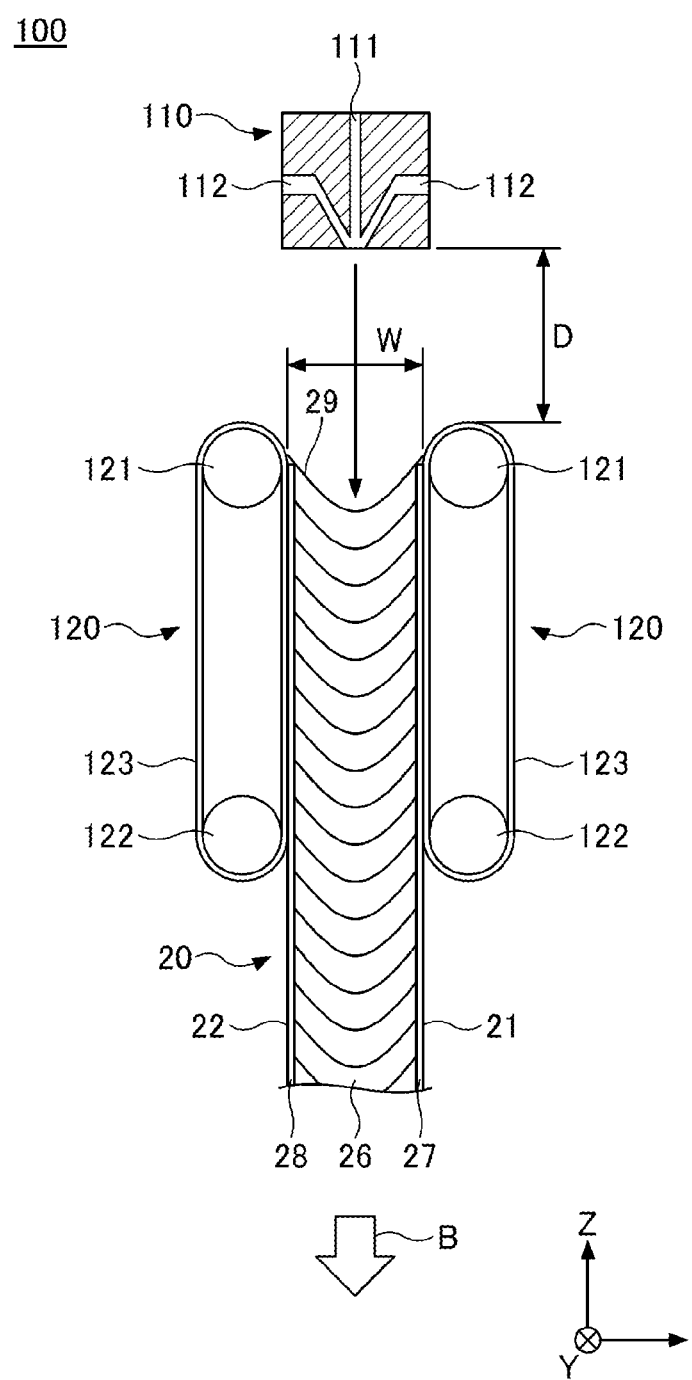
FIG. 7 is a diagram illustrating a production method of a second porous layer according an embodiment.

FIG. 7 is a diagram illustrating a production method of a second porous layer according an embodiment. The X-axis direction, the Y-axis direction, and the Z-axis direction in FIG. 7 have the same meaning as the X-axis direction, the Y-axis direction, and the Z-axis direction, respectively, in FIGS. 3 and 4. In FIG. 7, an arrow B indicates the conveyance direction of the second porous layer 20 (the Z-axis direction). As illustrated in FIG. 7, a production device 100 to produce the second porous layer 20 includes a die 110 and two collectors 120.

The die 110 includes resin nozzles 111 to discharge molten resin, and gas nozzles 112 to discharge gas such as air. The resin nozzles 111 discharge the molten resin, for example, downward in the vertical direction. The gas nozzles 112 are arranged on both sides of the resin nozzles 111 in the X-axis direction, to discharge a high-temperature gas obliquely downward so as to intersect with the flow of molten resin discharged from the corresponding resin nozzles 111, respectively. Multiple outlets of the resin nozzles 111 and multiple outlets of the gas nozzles 112 are provided at intervals on the bottom surface of the die 110 in the Y-axis direction. Note that although the discharge direction of the resin nozzles 111 is in the Z-axis direction (more specifically, downward in the vertical direction) in the present embodiment, the direction may be oblique with respect to the Z-axis direction.

Surfaces of the two collectors 120 facing each other are parallel, and each is perpendicular to the X-axis direction. A conveyance path of the second porous layer 20 is formed between the surfaces of the two collectors 120 facing each other. The second porous layer 20 is conveyed along with an endless belt 123 in the Z-axis direction (more specifically, downward in the vertical direction), and after passing the space between the two collectors 120, bent and conveyed horizontally. As a result, the thickness D2 of the second porous layer 20 (see FIG. 3) becomes smaller than a spacing W between the two collectors 120 due to its own weight or the like. Note that although the spacing W between the two collectors 120 is constant in the present embodiment as illustrated in FIG. 7, it may become narrower or become wider from the upstream to the downstream in the conveyance direction.

Each of the collectors 120 includes, for example, a first pulley 121, a second pulley 122, and the endless belt 123 looped around the first pulley 121 and the second pulley 122. The axial direction of the rotational axis of each of the first pulley 121 and second pulley 122 is set to the Y-axis direction. At least one of the first pulley 121 and the second pulley 122 is a drive pulley that is rotated by a drive source such as a rotating motor. By continuously rotating the drive pulley, the second porous layer 20 is continuously conveyed along with the endless belt 123.

Figure 8:
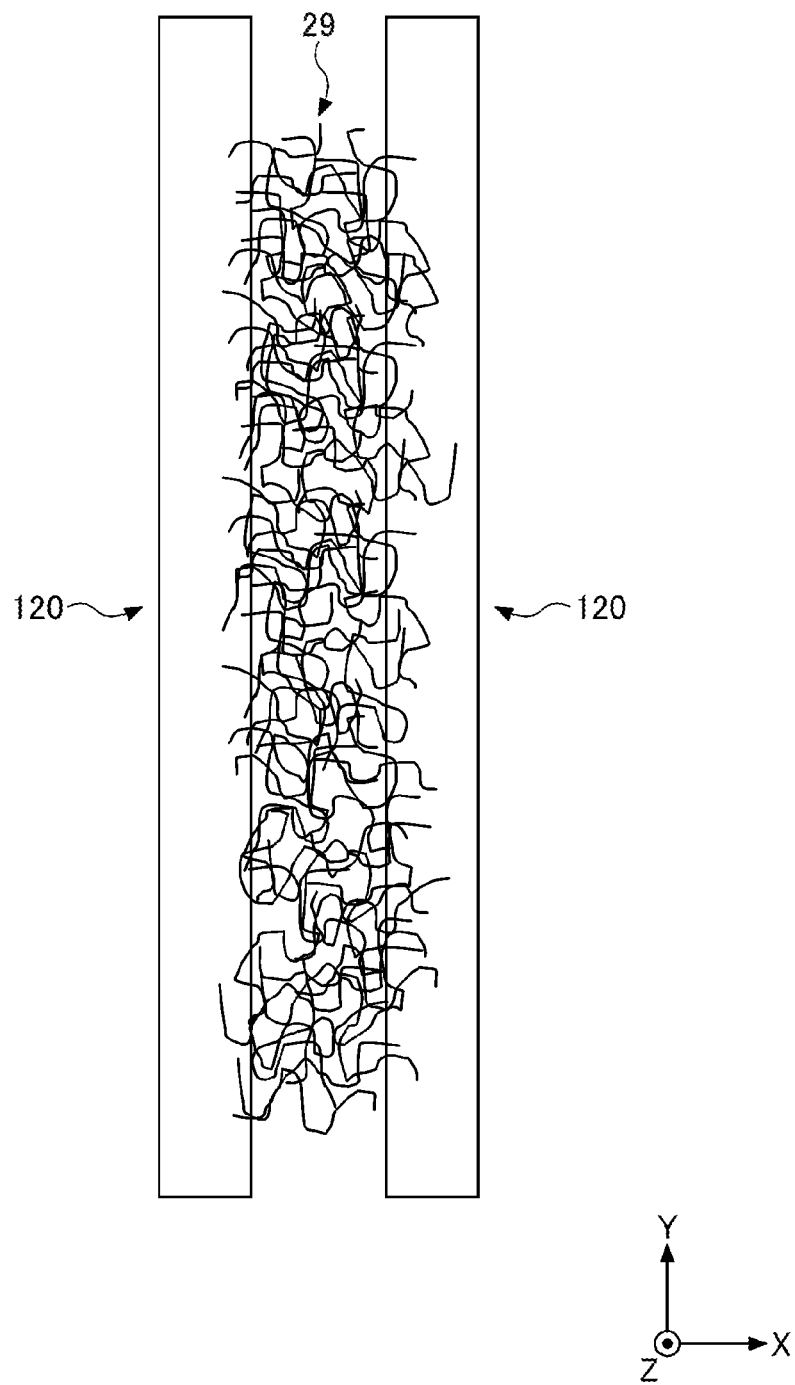
FIG. 8 is a diagram illustrating an example of an organic fiber layer formed between two collectors illustrated in FIG. 7.

FIG. 8 is a diagram illustrating an example of an organic fiber layer formed between two collectors illustrated in FIG. 7. Molten resin discharged from the resin nozzles 111 is stretched to be fibrous by high-speed air discharged from the gas nozzles 112, to form an organic fiber layer 29. The organic fiber layer 29 is a non-woven fabric in which multiple organic fibers are interknitted together as viewed in the Z-axis direction.

The organic fiber layer 29 is hung between the two collectors 120 provided with spacing in the X-axis direction as viewed in the Z-axis direction. As illustrated in FIG. 7, the ends of the organic fiber layer 29 in the X-axis direction adhere to the endless belts 123 in the vicinity of the top ends, respectively. The top end of the endless belt 123 is wrapped around the outer circumference of the first pulley 121, and changes the orientation as the first pulley 121 rotates. Accordingly, the ends of the organic fiber layer 29 in the X-axis direction change the orientation, to form the skin layers 27 and 28. On the other hand, the center portion of the organic fiber layer 29 in the X-axis direction forms the non-woven fabric layer 26.

Note that although each of the collectors 120 includes the endless belt 123 in the present embodiment, the endless belt 123 may be omitted. At least one of the collectors 120 may be constituted with a roll directly contacting the second porous layer 20. In this case, the roll may be provided with a suction source to suction the second porous layer 20.

The second porous layer 20 in each of the above embodiment, the above first modified example, and the above second modified example is a vertically oriented article that includes multiple non-woven fabric layers 26 arranged continuously in an in-plane direction of the second porous layer 20. On the other hand, a second porous layer 20A in the following third modified example is a horizontally oriented article that includes multiple non-woven fabric layers 26A arranged continuously in the thickness direction of the second porous layer 20A. In the following, the third modified example will be described mainly focused on differences with reference to FIGS. 9 to 11.

Figure 9:
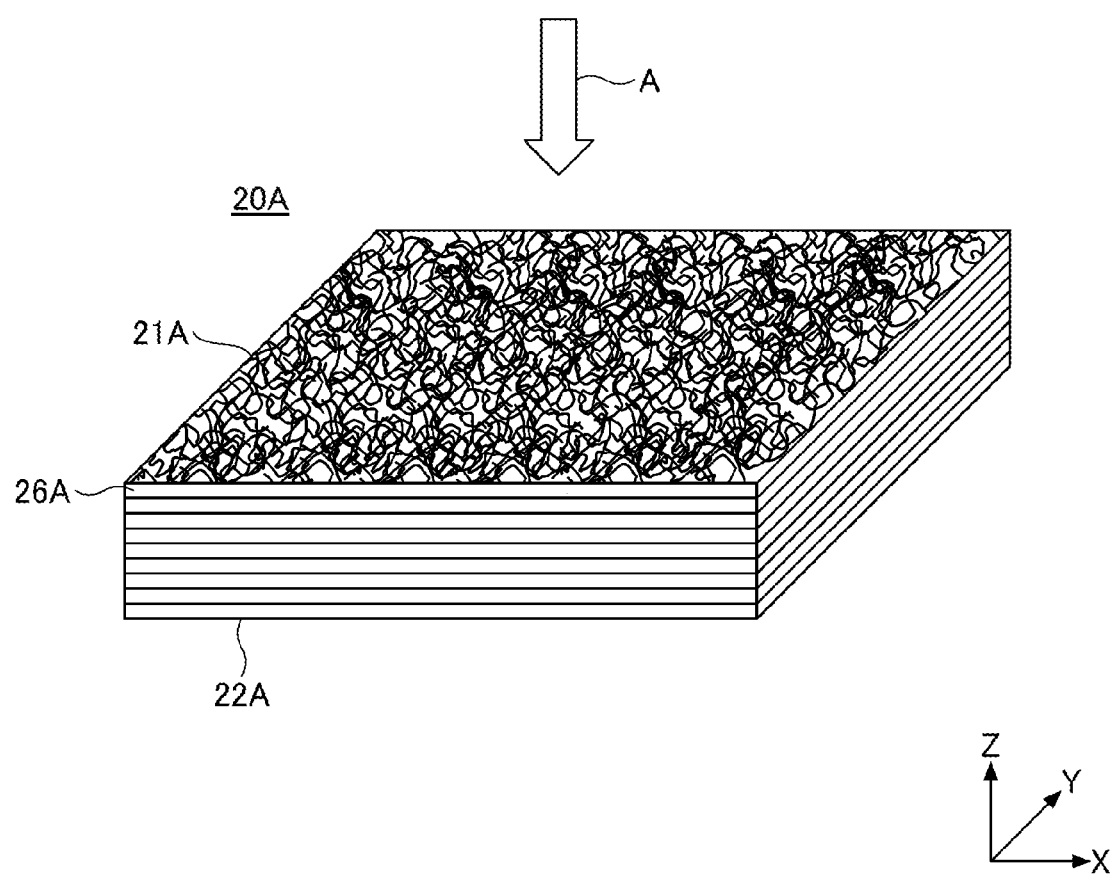
FIG. 9 is a perspective view illustrating a second porous layer according to a third modified example.
Figure 10:
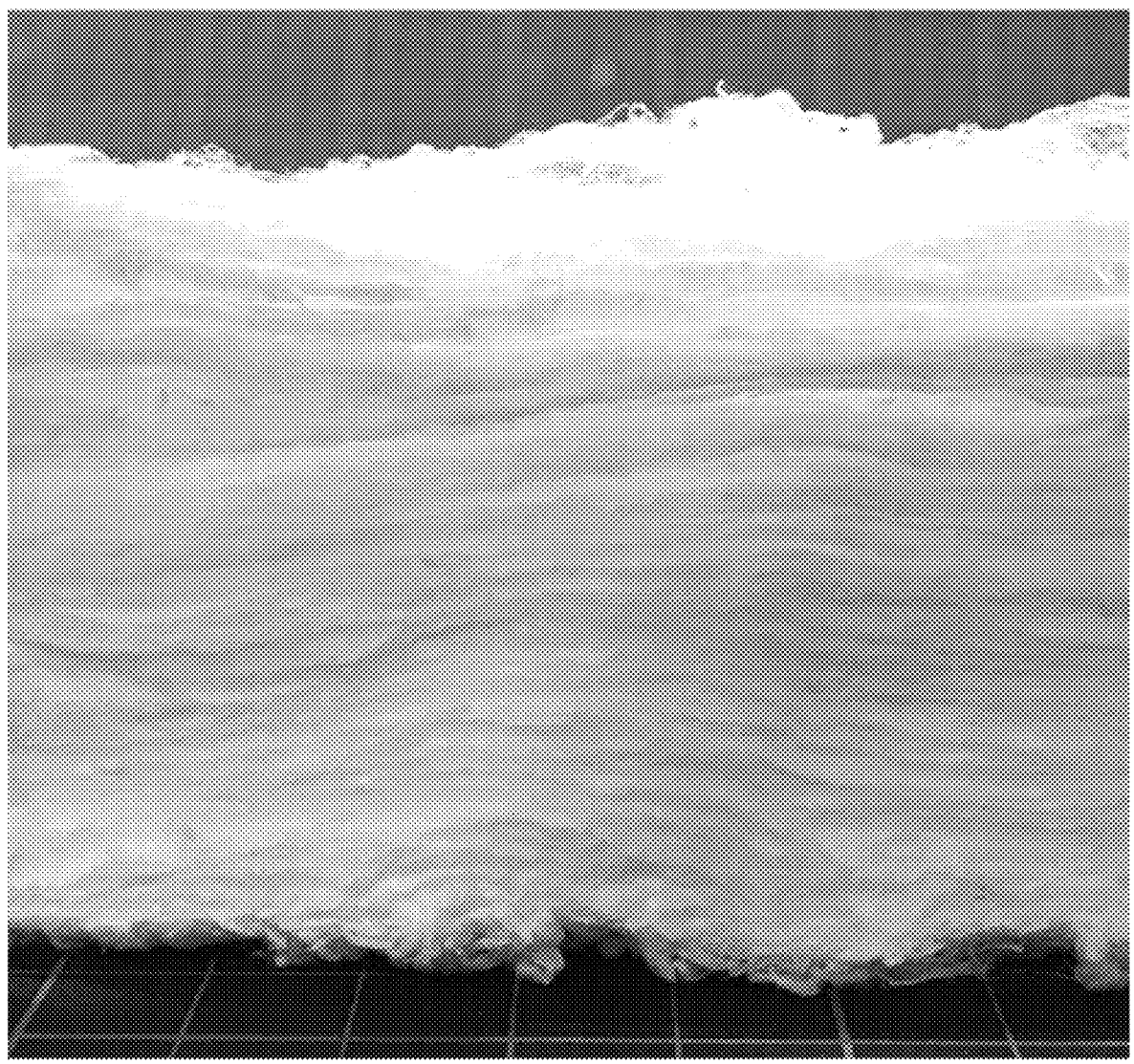
FIG. 10 is a cross sectional photograph presenting a second porous layer according to a third modified example.
Figure 10:
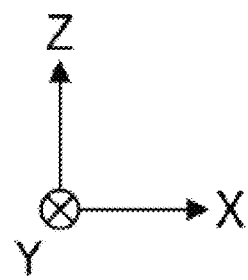

FIG. 9 is a perspective view illustrating a second porous layer according to the third modified example. FIG. 10 is a cross sectional photograph presenting a second porous layer according to the third modified example. In FIGS. 9 and 10, the X-axis direction, the Y-axis direction, and the Z-axis direction are perpendicular to one another. In FIGS. 9 and 10, unlike FIGS. 3 to 8 and the like, the Z-axis direction is set to the thickness direction of the second porous layer. The X-axis direction and the Y-axis direction correspond to in-plane directions of the second porous layer.

In FIG. 9, an arrow A indicates an incident direction of a sound wave on the second porous layer 20A. Note that in FIG. 9, although the sound wave is incident on the principal surface 21A of the second porous layer 20A perpendicularly, it may be incident obliquely. Also, sound waves may incident on from both sides of the second porous layer 20A, and may incident on both of the two principal surfaces 21A and 22A.

The mean diameter of fibers of the second porous layer 20A is greater than or equal to 0.5 μm and less than or equal to 14 μm, as is the mean diameter of fibers of the second porous layer 20 of the embodiment described above. Also, the solid occupancy S of the second porous layer 20A is greater than or equal to 1.0% and less than or equal to 8.0%, as is the solid occupancy S of the second porous layer 20 of the embodiment described above. Therefore, according to the present modified example, as in the embodiment described above, sound waves tends to be more easily attenuated by friction between the air and the organic fibers whose mean diameter is greater than or equal to 0.5 μm and less than or equal to 14 μm, and an attenuation constant of greater than or equal to 10 Neper/m can be achieved. Also, the weight can be reduced.

The second porous layer 20A includes multiple non-woven fabric layers 26A that are peelable and arranged continuously in the thickness direction (the Z-axis direction in FIGS. 9 and 10). Each of the multiple non-woven fabric layers 26A is constituted with multiple organic fibers interknitted together as viewed in the thickness direction. Adjacent non-woven fabric layers 26A can be peeled easily at the interface of these.

Figure 11:
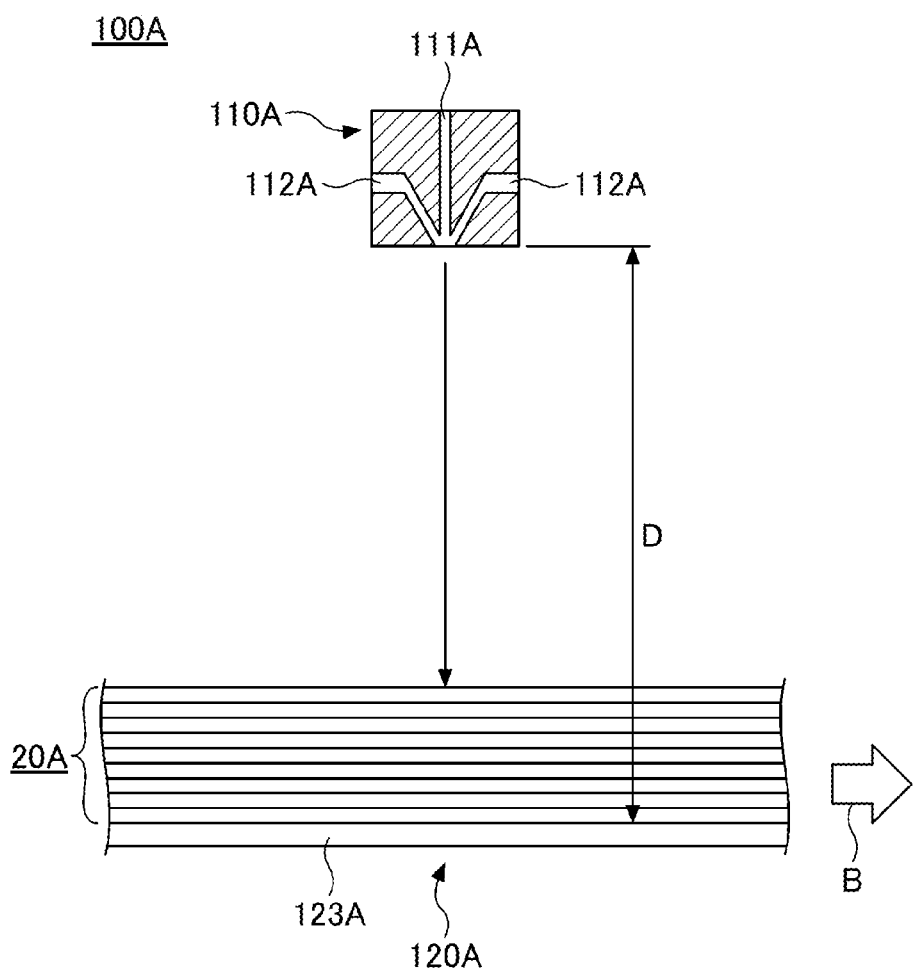
FIG. 11 is a diagram illustrating a production method of a second porous layer according to the third modified example.

FIG. 11 is a diagram illustrating a production method of a second porous layer according to the third modified example. The X-axis direction, the Y-axis direction, and the Z-axis direction in FIG. 11 have the same meaning as the X-axis direction, the Y-axis direction, and the Z-axis direction in FIG. 9. In FIG. 11, an arrow B indicates the conveyance direction of the second porous layer (the X-axis direction).

As illustrated in FIG. 11, a production device 100A to produce the second porous layer 20A includes a die 110A and a collector 120A. The die 110A includes resin nozzles 111A and gas nozzles 112A, as in the case of the die 110 of the embodiment described above. Note that although the discharge direction of the resin nozzles 111A is in the Z-axis direction (more specifically, downward in the vertical direction) in the present modified example, the direction may be oblique with respect to the Z-axis direction.

The collector 120A includes an endless belt 123A looped around a first pulley and a second pulley (not illustrated). The top surface of the endless belt 123A may be a horizontal surface perpendicular to the Z-axis direction. The second porous layer 20 is gradually formed on the top surface of the endless belt 123A while being conveyed in the X-axis direction along with the endless belt 123A.

APPLICATION EXAMPLES

In the following, specific application examples and comparative examples will be described. Among Examples 1 to 14 described in the following, Examples 1 to 9 are application examples, whereas Examples 10 to 14 are comparative examples. At the outset, first, flame-retardant fiber sheets and organic fiber sheets used in Examples 1 to 14 will be described individually. Note that in the application examples, a flame-retardant fiber sheet corresponds to a first porous layer (or both first porous layer and third porous layer), and an organic fiber sheet corresponds to a second porous layer.

[Flame-Retardant Fiber Sheets 1 to 8]

As a flame-retardant fiber sheet 1, a carbonized fiber felt manufactured by Osaka Seisakusho Co., Ltd. (product name: PC-400, thickness: 2.0 mm, surface density: 400 g/m$^2$, coefficient of overall heat transmission: 20 W/m$^2$·K) was used.

As a flame-retardant fiber sheet 2, a carbonized fiber felt manufactured by Asahi Kasei Advance Corporation (product name: NEWLASTAN TOP8150Z, thickness: 1.5 mm, surface density: 150 g/m$^2$, coefficient of overall heat transmission: 26 W/m$^2$·K) was used.

As a flame-retardant fiber sheet 3, an alkaline earth silicate wool manufactured by IBIDEN Corporation (product name: IBIWOOL-E paper, thickness: 1.0 mm, surface density: 180 g/m$^2$, coefficient of overall heat transmission: 100 W/m$^2$·K) was used. This alkaline earth silicate wool includes ceramic fibers.

As a flame-retardant fiber sheet 4, an alkaline earth silicate wool manufactured by IBIDEN Corporation (product name: IBIWOOL-E paper, thickness: 3.0 mm, surface density: 540 g/m$^2$, coefficient of overall heat transmission: 33 W/m$^2$·K) was used. This alkaline earth silicate wool includes ceramic fibers.

As a flame-retardant fiber sheet 5, a glass cloth manufactured by NICHIAS Corporation (product name: MARINE-TEX™ Cloth 0.7A, thickness: 0.7 mm, surface density: 428 g/m$^2$, coefficient of overall heat transmission: 85 W/m$^2$·K) was used. This glass cloth includes glass fibers.

As a flame-retardant fiber sheet 6, a glass cloth manufactured by NICHIAS Corporation (product name: MARINE-TEX™ Cloth 0.2A, thickness: 0.2 mm, surface density: 232 g/m², coefficient of overall heat heat transmission: 500 W/m²·K) was used. This glass cloth includes glass fibers.

As a flame-retardant fiber sheet 7, a glass wool manufactured by Asahi Fiber Glass Co., Ltd. (product name: Glasron wool GW64, thickness: 25.0 mm, surface density: 1600 g/m², coefficient of overall heat transmission: 1.3 W/m²·K) was used. This glass wool includes glass fibers.

As a flame-retardant fiber sheet 8, a glass wool manufactured by Asahi Fiber Glass Co., Ltd. (product name: Glasron wool GW32, thickness: 25 mm, surface density: 800 g/m², coefficient of overall heat transmission: 1.4 W/m²·K) was used. This glass wool includes glass fibers.

Table 1 summarizes physical properties of the flame-retardant fiber sheets 1 to 8. Note that as the flame-retardant fiber sheets 7 and 8 were used instead of organic fiber sheets 1 to 6 that will be described later, the physical properties that are common to those of the organic fiber sheets 1 to 6 are shown in Table 1.

TABLE 1

| | Flame retardant fiber sheet number | | | | | | | |
|---|---|---|---|---|---|---|---|---|
| | 1 | 2 | 3 | 4 | 5 | 6 | 7 | 8 |
| Form | Carbonized fiber felt | | Ceramic wool | | Glass cloth | | Glass wool | |
| Thickness (mm) | 2.0 | 1.5 | 1.0 | 3.0 | 0.7 | 0.2 | 25.0 | 25.0 |
| Surface density (g/m²) | 400 | 150 | 180 | 540 | 428 | 232 | 1600 | 800 |
| Coefficient of overall heat transmission (W/m² · K) | 20 | 26 | 100 | 33 | 85 | 500 | 1.3 | 1.4 |
| Bulk density (kg/m³) | — | — | — | — | — | — | 64 | 32 |
| Solid occupancy (%) | — | — | — | — | — | — | 1.88 | 0.94 |
| Mean diameter of fibers (μm) | — | — | — | — | — | — | 5.9 | 7.7 |
| Thickness of skin layer (mm) | — | — | — | — | — | — | — | — |
| Attenuation constant (Neper/m) | — | — | — | — | — | — | 20.0 | 6.1 |
| Characteristic impedance (N · s/m³) | — | — | — | — | — | — | 987 | 688 |

[Organic Fiber Sheets 1 to 6]

An organic fiber sheet 1 is a vertically oriented article produced by using the production device 100 illustrated in FIG. 7. As the raw material for organic fibers, Moplen HP461Y, a polypropylene resin manufactured by PolyMirae Company Ltd., was used. The polypropylene resin was melt and kneaded at 250° C. in an extruder, and then, delivered to the die 110 with a discharge quantity of 2.9 kg/h by using a gear pump. The die 110 was heated in advance to 250° C. As the die 110, a die that had 484 resin nozzles 111 arranged in a row at intervals of 0.72 mm in the Y-axis direction, was used. The discharge direction of each of the resin nozzles 111 was set to the Z-axis direction (more specifically, downward in the vertical direction), and the diameter of the discharge port of each of the resin nozzles 111 was 0.2 mm. A pair of gas nozzles 112 was provided on both sides of each of the resin nozzles 111 in the X-axis direction, the air flow rate at each of the gas nozzles 112 was set to 76 m/sec, and the air temperature at each of the gas nozzles 112 was set at 270° C. Also, the distance D in the vertical direction (see FIG. 7) between the die 110 and each of the collector 120 was set to 400 mm. The interval W between the two collectors 120 was set to be constant at 55 mm, and the conveying speed V of an organic fiber sheet by the two collectors 120 was set to 0.25 m/min.

An organic fiber sheet 2 is a vertically oriented article produced under the same conditions as the organic fiber sheet 1 described above, except for the die temperature, discharge volume of resin, diameter of the nozzle outlet of resin, air temperature, air flow rate, distance D in the vertical direction, and conveying speed V. The die temperature was set to 260° C., the resin discharge volume was set to 1.5 kg/h, the diameter of the nozzle outlet of resin was set to 0.15 mm, the air temperature was set to 300° C., the air flow rate was set to 39 m/sec, the distance D in the vertical direction was set to 300 mm, and the conveying speed V was set to 0.2 m/min.

An organic fiber sheet 3 is a vertically oriented article produced under the same conditions as the organic fiber sheet 1 described above, except for the die temperature, discharge volume of resin, diameter of the nozzle outlet of resin, air temperature, air flow rate, interval W between the collectors, and conveying speed V. The die temperature was set to 260° C., the resin discharge volume was set to 5.8 kg/h, the diameter of the nozzle outlet of resin was set to 0.15 mm, the air temperature was set to 285° C., the air flow rate was set to 116 m/sec, the interval W between the collectors was set to 40 mm, and the conveying speed V was set to 0.2 m/min.

An organic fiber sheet 4 is a vertically oriented article produced under the same conditions as the organic fiber sheet 1 described above, except for the die temperature, discharge volume of resin, diameter of the nozzle outlet of resin, air temperature, air flow rate, distance D in the vertical direction, and conveying speed V. The die temperature was set to 260° C., the resin discharge volume was set to 5.8 kg/h, the diameter of the nozzle outlet of resin was set to 0.15 mm, the air temperature was set to 295° C., the air flow rate was set to 77 m/sec, the distance D in the vertical direction was set to 300 mm, and the conveying speed V was set to 0.5 m/min.

An organic fiber sheet 5 is a horizontally oriented article produced by using the production device 100A illustrated in FIG. 11. As the raw material for organic fibers, Moplen HP461Y, a polypropylene resin manufactured by PolyMirae Company Ltd., was used. The polypropylene resin was melt and kneaded at 260° C. in an extruder, and then, delivered to the die 110A with a discharge quantity of 2.9 kg/h by using a gear pump. The die 110A was heated in advance to 260° C. As the die 110A, a die that had 484 resin nozzles 111A arranged in a row at intervals of 0.72 mm in the Y-axis direction, was used. The discharge direction of each of the resin nozzles 111A was set to the Z-axis direction (more specifically, downward in the vertical direction), and the diameter of the discharge port of each of the resin nozzles 111A was 0.15 mm. A pair of gas nozzles 112A was provided on both sides of each of the resin nozzles 111A in the X-axis direction, the air flow rate at each of the gas nozzles 112A was set to 77 m/sec, and the air temperature at each of the gas nozzles 112 was set at 295° C. Also, the distance D in the vertical direction (see FIG. 11) between the die 110A and the collector 120A was set to 700 mm. The top surface of the collector 120A was a horizontal plane perpendicular to the Z-axis direction. The conveying speed V of an organic fiber sheet by the collector 120A was set to 0.3 m/min.

Table 2 summarizes production conditions for the organic fiber sheets 1 to 5.

TABLE 2

| | Flame retardant fiber sheet number | | | | |
|---|---|---|---|---|---|
| | 1 | 2 | 3 | 4 | 5 |
| Orientation | Vertical | Vertical | Vertical | Vertical | Horizontal |
| Dice temperature (° C.) | 250 | 260 | 260 | 260 | 260 |
| Discharge quantity of resin (kg/h) | 2.9 | 1.5 | 5.8 | 5.8 | 2.9 |
| Diameter of discharge opening of resin nozzle (mm) | 0.2 | 0.15 | 0.15 | 0.15 | 0.15 |
| Air temperature (° C.) | 270 | 300 | 285 | 295 | 295 |
| Air flow speed (m/sec) | 76 | 39 | 116 | 77 | 77 |
| Distance D between dice and collector (mm) | 400 | 300 | 400 | 300 | 700 |
| Interval W between two collectors (mm) | 55 | 55 | 40 | 55 | — |
| Conveying speed V by collectors (m/min) | 0.25 | 0.2 | 0.2 | 0.5 | 0.3 |

As an organic fiber sheet 6, a commercially available PET felt was used.

The following measurements were performed for the organic fiber sheets 1 to 6. Note that the thickness of the skin layer as measured only for the organic fiber sheets 1 to 4 as vertically oriented articles.

<Thickness of Organic Fiber Sheets>

The thickness of an organic fiber sheet was measured by placing a test piece cut from the organic fiber sheet on a horizontal mounting surface of a table, and measuring the thickness at five points in the vicinity of the center of the test piece as viewed from the above by a thickness gauge, and taking an arithmetic mean of the measured values at the five points. The test piece was cut to have a rectangular shape of 100 mm long and 100 mm wide as viewed in a direction perpendicular to the principal surface of the organic fiber sheet. The test piece was placed on a mounting surface of the table so that the cut surface of the test piece was perpendicular to the mounting surface of the table.

<Thickness of Skin Layers>

The thickness of skin layers was measured by measuring thicknesses at three points in each of two skin layers of a test piece cut from an organic fiber sheet by a thickness gauge, and then, taking the arithmetic mean of measured values at the six points. The test piece was cut to have a rectangular shape of 100 mm long and 100 mm wide as viewed in a direction perpendicular to the principal surface of the organic fiber sheet, from the center of the organic fiber sheet in the Y-axis direction (see FIG. 7 and FIG. 11). Note that the arithmetic mean of the thicknesses at the three points on one of the skin layers coincided with the arithmetic mean of the thicknesses at the three points on the other of the skin layers within a range of error.

<Mean Diameter of Fibers of Organic Fiber Sheets>

The mean diameter of fibers of an organic fiber sheet was measured by image analysis of SEM micrographs (scanning electron micrographs) of a test piece cut from the organic fiber sheet. The test piece was cut to have a rectangular shape of 5 mm long and 10 mm wide as viewed in a direction perpendicular to the principal surface of the organic fiber sheet. A Pt film was formed in advance by using a sputtering device, on a cut surface on which the mean diameter of fibers of the test piece was measured. As the sputtering device, a magnetron sputtering device called MSP-15 manufactured by VACUUM DEVICE Corporation was used. The current value was set to 30 mA, and the deposition time was set to 30 seconds. As the scanning electron microscope (SEM), proX PREMIUM II manufactured by Phenom-World BV was used. The beam energy of the electron beam was set to 10 KeV. Electronic images were taken by using Automated Image Mapping of Pro Suite phenom application system manufactured by Phenom-World BV, by a magnification of 1500-fold while changing the imaging location. In total, fiber diameters at 1000 locations were measured from 30 electronic images by the image analysis, and the arithmetic mean of the measured fiber diameters was set as the mean diameter of fibers. The image analysis was performed by using a fiber metric function of the Pro suitephenom application system manufactured by Phenom-World BV.

<Solid Occupancy of Organic Fiber Sheets>

The solid occupancy of an organic fiber sheet was calculated by multiplying the bulk density (BD) of the organic fiber sheet divided by the true density (TD) of the solid (BD/TD), by 100 (BD/TD×100). The bulk density (BD) of the organic fiber sheet was obtained by dividing the mass of a test piece cut from the organic fiber sheet by the volume of the test piece. The test piece was cut to be a circle having a diameter of 100.5 mm as viewed in a direction perpendicular to the principal surface of the organic fiber sheet. The volume of the test piece was measured by multiplying the area of the circle having the diameter of 100.5 mm by the total thickness of the organic fiber sheet. The mass of the test piece was measured by an electronic balance. As the true density of the solids, the true density of organic fibers constituting the solids was used. The true density of Moplen HP461Y as a polypropylene resin manufactured by POLYMIRAE used as the material of organic fibers, was 920 kg/m$^3$.

<Attenuation Constant of Organic Fiber Sheets>

The attenuation constant (in Neper/m) of an organic fiber sheet was measured according to JIS A 1405-2 by using a vertical incidence sound absorbing factor measurement system called WinZacMTX manufactured by Nihon Onkyo Engineering Co., Ltd. Specifically, by having a sound wave incident perpendicularly on a plane on one side of a test piece having a cylindrical shape used for measuring the solid occupancy, and changing the frequency of the sound wave by an interval of 20 Hz from 200 Hz to 1000 Hz, an attenuation constant at each frequency was measured, and the arithmetic mean of the measured values at the 41 points was set as the attenuation constant of the organic fiber sheet. Note that attenuation constants at frequencies lower than 200 Hz were excluded from the measurement because measurement errors are large.

<Characteristic Impedance of Organic Fiber Sheets>

The characteristic impedance of an organic fiber sheet (in units of N·s/m$^3$) was measured according to JIS A 1405-2 by using a vertical incidence sound absorbing factor measurement system called WinZacMTX manufactured by Nihon Onkyo Engineering Co., Ltd., as was the attenuation constant. Specifically, by having a sound wave incident perpendicularly on a plane on one side of a test piece having a cylindrical shape used for measuring the solid occupancy, and changing the frequency of the sound wave by an interval of 20 Hz from 200 Hz to 1000 Hz, a characteristic impedance (more specifically, the real part of the characteristic impedance) at each frequency was measured, and the arithmetic mean of the measured values at the 41 points was set as the characteristic impedance of the organic fiber sheet.

Table 3 summarizes physical properties of the organic fiber sheets 1 to 6.

TABLE 3

| | Flame retardant fiber sheet number | | | | | |
|---|---|---|---|---|---|---|
| | 1 | 2 | 3 | 4 | 5 | 6 |
| Orientation | Vertical | Vertical | Vertical | Vertical | Horizontal | — |
| Thickness (mm) | 42.0 | 30.2 | 42.9 | 27.5 | 29.6 | 40.0 |
| Surface density (g/m$^2$) | 640 | 280 | 1355 | 567 | 493 | 1400 |
| Bulk density (kg/m$^3$) | 15.0 | 9.3 | 31.6 | 20.6 | 16.7 | 35.0 |
| Solid occupancy (%) | 1.65 | 1.01 | 3.43 | 2.24 | 1.81 | 2.76 |
| Mean diameter of fibers (μm) | 5.6 | 4.2 | 3.5 | 4.5 | 3.3 | 14.7 |
| Thickness of skin layer (mm) | 0.72 | 0.56 | 0.87 | 0.75 | — | — |
| Attenuation constant (Neper/m) | 15.8 | 11.2 | 16.2 | 14.1 | 11.9 | 8.4 |
| Characteristic impedance (N · s/m$^3$) | 932 | 1022 | 1387 | 1090 | 1246 | 634 |

As for the organic fiber sheets 1 to 5, the mean diameter of fibers was within a range of greater than or equal to 0.5 μm and less than or equal to 14 μm, and the solid occupancy S was within a range of greater than or equal to 1.0% and less than or equal to 8.0%; therefore, high attenuation constants (greater than or equal to 10 Neper/m) were obtained. On the other hand, the organic fiber sheet 6 had a mean diameter of fibers being greater than 14 μm; therefore, the attenuation constant was lower.

Examples 1 to 14

In Example 1, by having a principal surface of one flame-retardant fiber sheet 1 face a principal surface of one organic fiber sheet 1, and bonding these by hot melt, a test sheet 1 was prepared. As in Example 1, in Example 2, by having a principal surface of one flame-retardant fiber sheet 1 face a principal surface of one organic fiber sheet 1, and bonding these by hot melt, a test sheet 2 was prepared. In Example 3, one organic fiber sheet 1 was sandwiched between two flame-retardant fiber sheets 1, and bonding these by hot melt, a test sheet 3 was prepared. In Example 4, by having a principal surface of one flame-retardant fiber sheet 2 face a principal surface of one organic fiber sheet 2, and bonding these by hot melt, a test sheet 4 was prepared. In Example 5, by having a principal surface of one flame-retardant fiber sheet 2 face a principal surface of one organic fiber sheet 3, and bonding these by hot melt, a test sheet 5 was prepared. In Example 6, by having a principal surface of one flame-retardant fiber sheet 3 face a principal surface of one organic fiber sheet 4, and bonding these by hot melt, a test sheet 6 was prepared. In Example 7, by having a principal surface of one flame-retardant fiber sheet 3 face a principal surface of one organic fiber sheet 5, and bonding these by hot melt, a test sheet 7 was prepared. In Example 8, by having a principal surface of one flame-retardant fiber sheet 5 face a principal surface of one organic fiber sheet 4, and bonding these by hot melt, a test sheet 8 was prepared. In Example 9, by having a principal surface of one flame-retardant fiber sheet 6 face a principal surface of one organic fiber sheet 5, and bonding these by hot melt, a test sheet 9 was prepared.

In Example 10, only one flame-retardant fiber sheet 7 was used as a test sheet 10. In Example 11, by having a principal surface of one flame-retardant fiber sheet 1 face a principal surface one flame-retardant fiber sheet 8, and bonding these by hot melt, a test sheet 11 was prepared. In Example 12, only one organic fiber sheet 1 was used as a test sheet 12. In Example 13, by having a principal surface of one flame-retardant fiber sheet 4 face a principal surface of one organic fiber sheet 3, and bonding these by hot melt, a test sheet 13 was prepared. In Example 14, by having a principal surface of one flame-retardant fiber sheet 1 face a principal surface of one organic fiber sheet 6, and bonding these by hot melt, a test sheet 14 was prepared.

<Lightness of Test Sheets>

When evaluating the lightness, in the case where the surface density was less than or equal to 1550 g/m$^2$, it was determined as passing, or otherwise, determined as failing.

<Soundproof Performance of Test Sheets>

The attenuation constants of the test sheets 1 to 14 were measured in substantially the same way as the attenuation constants of the organic fiber sheets 1 to 6. Also, the characteristic impedances of the test sheets 1 to 14 were measured in substantially the same way as the characteristic impedances of the organic fiber sheets 1 to 6.

Here, when measuring the soundproof performance of the test sheets 1, 4 to 9, and 13 to 14, the organic fiber sheet was arranged on the sound source side, and the flame-retardant fiber sheet was arranged on the side opposite to the sound source.

However, when measuring the soundproof performance of the test sheet 2, the flame-retardant fiber sheet was arranged on the sound source side, and the organic fiber sheet was arranged on the side opposite to the sound source.

Also, when measuring the soundproof performance of the test sheet 11, the flame-retardant fiber sheet 8 was arranged on the sound source side, and the flame-retardant fiber sheet 1 was arranged on the side opposite to the sound source.

Note that each of the test sheets 3, 10, and 12 has a symmetrical structure in the thickness direction; therefore, these were arranged appropriately.

When evaluating the soundproof performance, in the case where both sound insulating performance and sound absorbing performance were determined as passing, it was determined as passing, or otherwise, determined as failing. When evaluating the sound insulating performance, in the case where the attenuation constant was greater than or equal to 10 Neper/m, it was determined as passing, or otherwise, determined as failing. Also, when evaluating the sound absorbing performance, in the case where the characteristic impedance was less than or equal to 1400 N·s/m$^3$, it was determined as passing, or otherwise, determined as failing.

<Combustion Tests of Test Sheets>

Figure 12:
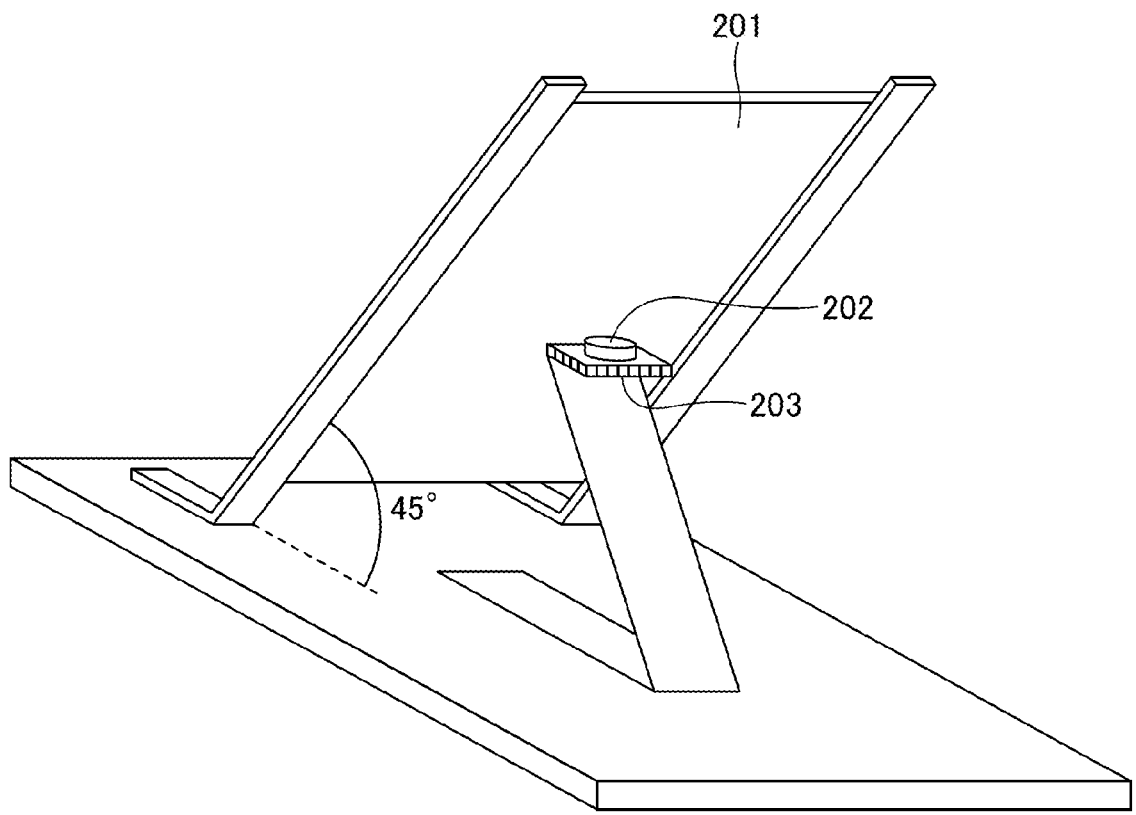
FIG. 12 is a diagram illustrating an example of a combustion test device.

By using a combustion test device illustrated in FIG. 12, combustion tests were performed according to a combustion test for materials for railway rolling stocks (for general materials; 45° ethyl alcohol test for non-metallic materials for railway rolling stocks) specified by Japan Railway Rolling Stock & Machinery Association. In FIG. 12, 201 denotes a test piece (182 mm×257 mm), 202 denotes a container of alcohol (made of iron, 17.5 φ×7.1, 0.8 t), and 203 denotes a container bearer made of cork.

As illustrated in FIG. 12, the test piece 201 was held tilted at 45° with respect to the horizontal plane. The test piece 201 corresponded to one of the test sheets 1 to 14. Also, the fuel container (container of alcohol) 202 was mounted on the container bearer 203 made of cork so that the center of the bottom of the fuel container 202 was positioned at 25.4 mm vertically below the center of the bottom surface of the test piece 201.

In the combustion tests of the test sheets 1, 2, 4 to 9, and 13 to 14, a flame-retardant fiber sheet was arranged on the fire source side (lower side) and the organic fiber sheet was arranged on the opposite side (upper side) of the fire source.

Also, in the combustion test of the test sheet 11, the flame-retardant fiber sheet 1 was arranged on the fire source side (lower side) and the flame-retardant fiber 8 sheet was arranged on the opposite side (upper side) of the fire source.

Note that each of the test sheets 3, 10, and 12 has a symmetrical structure in the thickness direction; therefore, these were arranged appropriately.

0.5 cc of ethyl alcohol was poured into the fuel container 202, ignited, and left for approximately two minutes until the fuel had burned out. Thereafter, the state of the test piece 201 was visually observed, to inspect (1) the presence or absence of flame, (2) the presence or absence of through holes penetrating through the test piece 201 in the thickness direction, and (3) the deformation ratio. The deformation ratio is, when setting the total area of the top surface of the test piece 201 (182 mm×257 mm) as 100%, the percentage of the area of a portion deformed by heat of the top surface of the test piece 201.

When evaluating the flame retardancy, in the case where there was no flame, no through hole, and the deformation ratio was less than or equal to 50%, it was determined as passing, or otherwise, determined as failing. Here, "no flame" means that the test piece 201 did not burn after the fuel had burned out, whereas "presence of flame" means that the test piece 201 still burned after the fuel had burned out.

<Flexibility Tests of Test Sheets>

The flexibility of a test sheet was examined by wrapping the test sheet around the outer circumference of a cylinder having a diameter of 100 mm.

When evaluating the flexibility, in the case where the test sheet could be wrapped around half the cylinder without any openings, it was determined as passing, or otherwise failing.

<Overall Passing or Failing>

When determining overall passing or failing of a sheet, in the case where all of the lightness, the soundproof performance, the flame retardancy, and flexibility were determined as passing, it was determined as passing, or otherwise, determined as failing.

Table 4 to Table 5 show the evaluation results of the test sheets 1 to 14.

TABLE 4

| | | Test sheet number | | | | | | | |
|---|---|---|---|---|---|---|---|---|---|
| | | 1 | 2 | 3 | 4 | 5 | 6 | 7 | 8 |
| 1st layer | | Flame retardant fiber sheet 1 | Flame retardant fiber sheet 1 | Flame retardant fiber sheet 1 | Flame retardant fiber sheet 2 | Flame retardant fiber sheet 2 | Flame retardant fiber sheet 3 | Flame retardant fiber sheet 3 | Flame retardant fiber sheet 5 |
| 2nd layer | | Organic fiber sheet 1 | Organic fiber sheet 1 | Organic fiber sheet 1 | Organic fiber sheet 2 | Organic fiber sheet 3 | Organic fiber sheet 4 | Organic fiber sheet 5 | Organic fiber sheet 4 |
| 3rd layer | | — | — | Flame retardant fiber sheet 1 | — | — | — | — | — |
| Layer on sound source side when measuring soundproof performance | | Organic fiber sheet 1 | Flame retardant fiber sheet 1 | — | Organic fiber sheet 2 | Organic fiber sheet 3 | Organic fiber sheet 4 | Organic fiber sheet 5 | Organic fiber sheet 4 |
| Layer on fire source side when measuring flame retardance | | Flame retardant fiber sheet 1 | Flame retardant fiber sheet 1 | — | Flame retardant fiber sheet 2 | Flame retardant fiber sheet 2 | Flame retardant fiber sheet 3 | Flame retardant fiber sheet 3 | Flame retardant fiber sheet 5 |
| Lightness | Surface density (g/m$^2$) | 1040 | 1040 | 1440 | 430 | 1505 | 747 | 673 | 995 |
| | Pass/fail | Pass | Pass | Pass | Pass | Pass | Pass | Pass | Pass |
| Soundproof performance | Attenuation constant (Neper/m) | 16.5 | 22.1 | 24.3 | 10.9 | 15.8 | 15.2 | 11.3 | 12.7 |
| | Characteristic impedance (N·s/m$^3$) | 830 | 871 | 883 | 950 | 1336 | 980 | 1335 | 912 |
| | Pass/fail | Pass | Pass | Pass | Pass | Pass | Pass | Pass | Pass |
| Flame retardance | Ignited or not | No | No | No | No | No | No | No | No |
| | Thru-hole generated or not | No | No | No | No | No | No | No | No |
| | Deformation ratio (%) | 0 | 0 | 0 | 25 | 0 | 10 | 15 | 10 |
| | Pass/fail | Pass | Pass | Pass | Pass | Pass | Pass | Pass | Pass |
| Flexibility | | Pass | Pass | Pass | Pass | Pass | Pass | Pass | Pass |
| Overall passing/failing | | Pass | Pass | Pass | Pass | Pass | Pass | Pass | Pass |

TABLE 5

| | Test sheet number | | | | | |
|---|---|---|---|---|---|---|
| | 9 | 10 | 11 | 12 | 13 | 14 |
| 1st layer | Flame retardant fiber sheet 6 | Flame retardant fiber sheet 7 | Flame retardant fiber sheet 1 | Organic fiber sheet 1 | Flame retardant fiber sheet 4 | Flame retardant fiber sheet 1 |

TABLE 5-continued

| | | Test sheet number | | | | | |
|---|---|---|---|---|---|---|---|
| | | 9 | 10 | 11 | 12 | 13 | 14 |
| 2nd layer | | Organic fiber sheet 5 | — | Flame retardant fiber sheet 8 | — | Organic fiber sheet 3 | Organic fiber sheet 6 |
| 3rd layer | | — | — | — | — | — | — |
| Layer on sound source side when measuring soundproof performance | | Organic fiber sheet 5 | — | Flame retardant fiber sheet 8 | — | Organic fiber sheet 3 | Organic fiber sheet 6 |
| Layer on fire source side when measuring flame retardance | | Flame retardant fiber sheet 6 | — | Flame retardant fiber sheet 1 | — | Flame retardant fiber sheet 4 | Flame retardant fiber sheet 1 |
| Lightness | Surface density (g/m$^2$) | 725 | 1600 | 1200 | 640 | 1895 | 1800 |
| | Pass/fail | Pass | Fail | Pass | Pass | Fail | Fail |
| Soundproof performance | Attenuation constant (Neper/m) | 10.4 | 20.0 | 7.2 | 15.8 | 16.4 | 9.8 |
| | Characteristic impedance (N · s/m$^3$) | 1224 | 987 | 655 | 932 | 1445 | 758 |
| | Pass/fail | Pass | Pass | Fail | Pass | Fail | Fail |
| Flame retardance | Ignited or not | No | No | No | Yes | No | No |
| | Thru-hole generated or not | No | No | No | Yes | No | No |
| | Deformation ratio (%) | 40 | 0 | 0 | 70 | 0 | 0 |
| | Pass/fail | Pass | Pass | Pass | Fail | Pass | Pass |
| Flexibility | | Pass | Fail | Pass | Pass | Pass | Pass |
| Overall passing/failing | | Pass | Fail | Fail | Fail | Fail | Fail |

The test sheets 1 to 9, unlike the test sheets 10 to 14, satisfied all the following requirements of (1) to (4), and therefore, were determined as passing for all of the lightness, the soundproof performance, the flame retardancy, and the flexibility.

(1) The test sheet included at least one flame-retardant fiber sheet and one organic fiber sheet.
(2) The test sheet had a surface density of greater than or equal to 400 g/m$^2$ and less than or equal to 1550 g/m$^2$.
(3) The organic fiber sheet was formed of organic fibers having a mean diameter of fibers being greater than or equal to 0.5 μm and less than or equal to 14 μm.
(4) The organic fiber sheet had a solid occupancy of greater than or equal to 1.0% and 8.0%.

On the other hand, the test sheet 10 was constituted only with a flame-retardant fiber sheet 7 having a surface density exceeding 1550 g/m$^2$; therefore, the lightness and the flexibility were determined as failing. Also, unlike the test sheet 1, the test sheet 11 included a flame-retardant fiber sheet 8 having a solid occupancy of less than 1.0% instead of an organic fiber sheet 1 having a solid occupancy of greater than or equal to 1.0%; therefore, it was determined as failing with respect to the soundproof performance (especially the sound insulating performance). Also, unlike test sheet 1, the test sheet 12 included only an organic fiber sheet 1; therefore, it was determined as failing with respect to the flame retardancy. Also, the test sheet 13 has a surface density exceeding 1550 g/m$^2$; therefore, it was determined as failing with respect to the lightness. Further, the test sheet 14 has a surface density exceeding 1550 g/m$^2$; therefore, it was determined as failing with respect to the lightness.

By the way, each of the test sheet 1 and the test sheet 2 had the same one organic fiber sheet 1 and the same one flame-retardant fiber sheet 1. As can be seen by comparing the soundproof performance of the test sheet 1 with the soundproof performance of the test sheet 2, regardless of the organic fiber sheet 1 being arranged on the sound source side, or the organic fiber sheet 1 being arranged on the other side, it can be understood that a good soundproof performance was obtained.

Each of the test sheets 1 and 2 had the flame-retardant fiber sheet 1 on one side of the organic fiber sheet 1, whereas the test sheet 3 had the flame-retardant fiber sheets 1 on both sides of the organic fiber sheet 1. As can be seen by comparing the soundproof performance of the test sheets 1 and 2 with the soundproof performance of the test sheet 3, regardless of the flame-retardant fiber sheet 1 being arranged on one side of the organic fiber sheet 1, or the flame-retardant fiber sheets 1 being arranged on both sides of the organic fiber sheet 1, it can be understood that a good soundproof performance was obtained.

As above, the embodiment of the laminated sheet according to the present disclosure has been described; note that the present disclosure is not limited to the above embodiment. Various changes, modifications, substitutions, additions, deletions, and combinations can be made within the scope of subject matters described in the claims. These are naturally considered as contained within the technical scope of the present disclosure.

For example, in the embodiment described above, the laminated sheet is used as a soundproofing material to attenuate incident sound waves. However, it may be used for applications other than as the soundproofing material. As the applications other than as the soundproofing material, a thermal insulation material, vibration damping material, or shock absorbing material, or the like may be enumerated

LIST OF REFERENCE CODES

2 laminated sheet
10 first porous layer
20 second porous layer
21, 22 principal surface
26 non-woven fabric layer
27, 28 skin layer

The invention claimed is:
1. A laminated sheet comprising:
a first porous layer including a plurality of fibers of at least one of inorganic fiber or carbonized fiber; and
a second porous layer formed of a plurality of organic fibers, wherein the second porous layer includes a plurality of non-woven fabric layers that are peelable and arranged continuously in a predetermined in-plane direction between two principal surfaces facing each other, wherein each of the plurality of non-woven fabric layers is constituted with a plurality of organic fibers interknitted together as viewed in the predetermined in-plane direction, wherein the laminated sheet has a surface density of greater than or equal to 400 g/m² and less than or equal to 1550 g/m², wherein the second porous layer is formed of the plurality of organic fibers having a mean diameter of fibers being greater than or equal to 0.5 μm and less than or equal to 14 μm, and wherein, expressing a total volume of solids and voids filling a unit volume of the second porous layer as 100%, a percentage of the solids is greater than or equal to 1.0% and less than or equal to 8.0%.

2. The laminated sheet as claimed in claim 1, further comprising:

a third porous layer that is arranged on a side of the second porous layer that is opposite to a side thereof on which the first porous layer is arranged, wherein the third porous layer includes a plurality of fibers of at least one of inorganic fiber or carbonized fiber.

3. The laminated sheet as claimed in claim 1, wherein the first porous layer has a thickness of greater than or equal to 0.5 mm and less than or equal to 10 mm.

4. The laminated sheet as claimed in claim 1, wherein the first porous layer has a coefficient of overall heat transmission of greater than or equal to 5.0 W/m²·K and less than or equal to $1.0 \times 10^3$ W/m²·K.

5. The laminated sheet as claimed in claim 1, wherein the laminated sheet has a thickness of greater than or equal to 1 mm and less than or equal to 100 mm.

6. The laminated sheet as claimed in claim 1, wherein the second porous layer includes, on each of the two respective principal surfaces facing each other, two skin layers in each of which a plurality of organic fibers are interknitted together as viewed in a thickness direction, wherein the plurality of non-woven fabric layers are arranged between the two skin layers, and each of the plurality of non-woven fabric layers is formed continuously with the two skin layers, and wherein each of the two skin layers has a thickness of greater than or equal to 0.01 mm and less than or equal to 5 mm.

7. The laminated sheet as claimed in claim 1, wherein the laminated sheet has an attenuation constant of greater than or equal to 10 Neper/m and less than or equal to 30 Neper/m.

8. The laminated sheet as claimed in claim 1, wherein the laminated sheet has a characteristic impedance of greater than or equal to 300 N·s/m³ and less than or equal to 1400 N·s/m³.

9. The laminated sheet as claimed in claim 1, wherein the laminated sheet is used as a soundproofing material to attenuate an incident sound wave.

\* \* \* \* \*